(12) United States Patent
Dowling

(10) Patent No.: US 6,522,688 B1
(45) Date of Patent: Feb. 18, 2003

(54) PCM CODEC AND MODEM FOR 56K BI-DIRECTIONAL TRANSMISSION

(76) Inventor: Eric Morgan Dowling, 5107 5th Ave., Holmes Beach, FL (US) 34217

( * ) Notice: Subject to any disclaimer, the term of this patent is extended or adjusted under 35 U.S.C. 154(b) by 0 days.

(21) Appl. No.: 09/231,183

(22) Filed: Jan. 14, 1999

(51) Int. Cl.⁷ ................................................ H04L 5/16
(52) U.S. Cl. .................... 375/222; 379/406.08
(58) Field of Search ................................ 375/222, 254; 370/352, 292, 276, 286; 379/442, 22, 399.01, 406.08

(56) References Cited

U.S. PATENT DOCUMENTS

| | | | | |
|---|---|---|---|---|
| 5,838,664 A | * | 11/1998 | Polomski | 348/14.09 |
| 5,974,142 A | * | 10/1999 | Heer et al. | 379/442 |
| 6,081,567 A | * | 6/2000 | Olafsson | 370/503 |
| 6,134,224 A | * | 10/2000 | Reese et al. | 370/286 |
| 6,151,364 A | * | 11/2000 | Ruether et al. | 375/222 |
| 6,317,419 B1 | * | 11/2001 | Olafsson et al. | 370/286 |

* cited by examiner

Primary Examiner—Stephen Chin
Assistant Examiner—Kevin Kim
(74) Attorney, Agent, or Firm—Eric M. Dowling

(57) ABSTRACT

A high-speed analog subscriber modem operates at speeds as high as 64 kbps in both the downlink and uplink directions using a standard POTS line augmented with an enhanced codec. This enables increased upload speeds and supports 56 kbps peer-to-peer analog subscriber connections. An enhanced network codec according to the present invention supports on a POTS line both high-speed modem communications and standard PCM speech communication. The enhanced codec of the present invention may be designed to be plug-compatible with existing codecs and may be used to upgrade POTS service to support data rates approaching 64 kbps. Similarly, the present invention may be used to increase the use of the POTS channel in a DSL system.

24 Claims, 7 Drawing Sheets

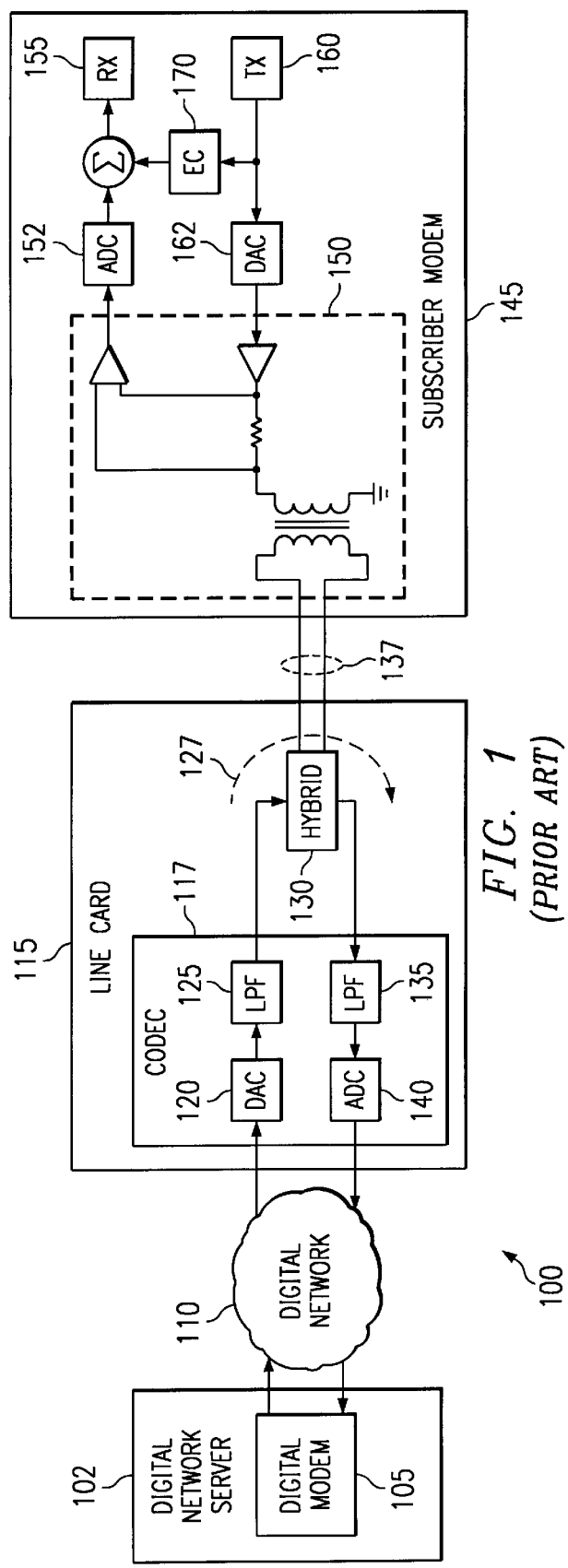
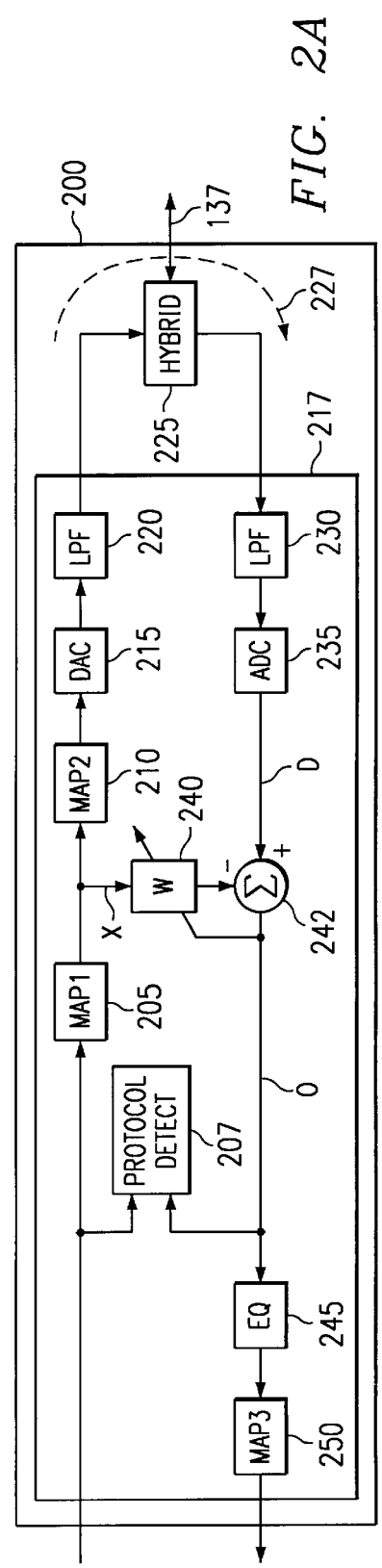
FIG. 1 (PRIOR ART)
FIG. 2A

PCM CODEC AND MODEM FOR 56K BI-DIRECTIONAL TRANSMISSION

The subject matter of this application is closely related to the following copending application which deals with certain aspects of the present invention as disclosed herein and is incorporated herein by reference: "High speed modem with uplink remote-echo canceller," serial number unknown, by Eric M. Dowling and filed on the same day as the present application, Jan. 14, 1999.

BACKGROUND OF THE INVENTION

1. Field of the Invention

This invention relates generally to data communications. More particularly, the invention relates to high-speed modems designed to provide transmission speeds of 56 kbps in both downlink and uplink directions.

2. Description of the Related Art

In the field of wireline telephone modems, one type of modem is known as a "V.90 modem." "V.90" references an international standard (recommendation V.90) agreed upon by the International Telecommunications Union (ITU-T). A V.90 modem is a specific member of a class of modems known as "PCM modems." In fact, before the V.90 standard was agreed upon, V.90 was known colloquially as "V.PCM." "PCM" is an acronym which stands for "pulse code modulation." PCM was originally developed to transmit digitized speech signals through a telephone network such as the public switched telephone network (PSTN). PCM as used in the PSTN is defined in the ITU-T G.711 standard. In the United States, PCM involves sampling a speech signal, encoding each sample to roughly 13 bits of linear resolution, and then logarithmically companding and re-encoding the sample to an 8-bit mu-law code. PCM coding involves a well-known and accepted form of nonlinear logarithmic compression whereby smaller signal amplitudes are represented at greater resolution than larger amplitudes. European countries use a different logarithmic compression law known as A-law. PCM encoding techniques provide a way to efficiently encode analog speech waveforms. This is because speech waveforms have a wide dynamic range and the human hearing system itself performs logarithmic signal processing.

The ITU-T's V.90 standard represents an accepted technology used to transfer information between an analog telephone subscriber and a network server such as an Internet service provider (ISP). V.90 compliant modems are asymmetric in that different signal protocols are used in the uplink and downlink communication directions. In connection with V.90 modems, the term "uplink" corresponds to the communication channel from the analog telephone subscriber to a digital network server. The "downlink" corresponds to the communication channel from the digital network server to the analog telephone subscriber. The V.90 recommendation makes the assumption that communication must pass through a standard network interface comprising a PCM codec. A PCM "codec" is a converter which converts an analog signal to a PCM signal (COder) and also converts a PCM signal to an analog signal (DECocer). A coder and a decoder are thus collectively called a "codec." The codec may be viewed as a communication impairment, because at this analog interface, noise and distortion are added to an otherwise pure digital communication path capable of carrying 64 kbps in both the uplink and downlink directions. Certain types of digital impairments such as robbed-bit signaling may also reduce sustainable data rates in the digital network to 56 kbps or lower.

FIG. 1 illustrates a network configuration as is present in a V.90 oriented communication system. A digital network server 102 typically represents an ISP or a database server which is connected to a digital network 110. The digital network 110 typically involves a network such as the PSTN and the digital network server 102 typically connects to the digital network 110 via a digital connection such as an ISDN line or a T1 line. The digital network server 102 thereby couples to the digital network 110 via a digital modem 105. No codec is needed to coupling the digital modem 105 to the digital network 110. The digital modem 105 transmits and receives digital information across the digital network 110. At the edge of the digital network 110 is a network interface 115 typically implemented using a line card. The network interface 115 includes a codec 117 and a line interface circuit 130. The codec 117 accepts a digital stream of information from the digital network 110 into a digital-to-analog converter (DAC) 120. The DAC 120 produces an analog output voltage based on the decompressed value of a mu-law code applied to its input. This data stream passing through the DAC 120 is said to travel in the "downlink" direction. The output of the DAC 120 feeds to a low pass filter (LPF) 125 which is also part of the codec 117. The LPF 125 attenuates high frequency components in the downlink signal to perform reconstruction and line filtering as is known in the art. The LPF 125 may also attenuate a small portion of the low frequency band, for example from 0 Hz to 250 Hz. The output of the LPF 125 feeds a line interface circuit 130 which in this example is illustrated as a hybrid circuit. The hybrid circuit 130 provides a four-wire to two-wire conversion and is typically implemented using transformers and electronic amplifiers. The hybrid circuit 130 interfaces to an analog subscriber line 137. The analog subscriber line 137 involves a telephone line and the electrical signaling applied thereto. The downlink signal as converted by the DAC 120 and filtered by the LPF 125 is coupled by the hybrid circuit 135 onto the subscriber line 137. An analog "uplink signal" is also coupled via the hybrid circuit 135 from the subscriber line 137. The analog uplink signal is passed via the hybrid circuit 130 to an LPF 135 which performs antialiasing. In addition to attenuating high frequency components, the LPF 135 may also attenuate a small portion of the low frequency band, for example from 0 Hz to 250 Hz. The output from the LPF 135 is passed to an analog-to-digital converter (ADC) 140. Besides converting the filtered analog uplink signal to digital, the ADC typically logarithmically compresses the data according a compression curve such as the mu-law curve. Both the LPF 135 and the ADC 140 are also typically implemented as a part of the codec 117 which is itself implemented on a single integrated circuit die. Because the ADC 140 is found within the network interface 115, the ADC 140 is also referred to herein as the "network-interface ADC." Similarly, the DAC 120 is also referred to herein as the "network-interface DAC."

Signals are coupled from the subscriber line 137 to an analog modem 145 via a line interface circuit 150. The subscriber line 137 is therefore coupled via a network-side coupling to the network interface 115 and via a subscriber-side coupling to the subscriber modem 145. A transmitter 160 generates a digital representation of an analog uplink to be sent over the subscriber line 137 back to the network interface 115. In present day V.90 systems, the digital representation of the analog uplink signal is defined by the physical layer signal specification of the ITU-T recommendation V.34. The digital signal output from the transmitter 160 is coupled to a DAC 162. Typically the DAC 162 is a high precision linear converter and is followed by a band-pass reconstruction filter with a passband in the range from approximately 250 Hz to 3500 Hz (not shown). This filtered analog uplink signal is coupled onto the subscriber line 137 via the line interface circuit 150. The analog downlink signal sent by the network interface 115 is coupled from the subscriber line 137 via the line interface circuit 150. Although not shown, the line interface circuit 150 also typically includes a receive-antialiasing filter. The received analog downlink signal is then digitized by an ADC 152 which typically samples its input at 16000 Hz and quantizes each sample to 16 bits of linear resolution. This received and digitized downlink signal is then combined with the digital representation of the analog uplink signal using an echo canceller 170. The echo canceller 170 cancels an echo component which leaks from the transmit circuit 160's output into a receiver circuit 155's input via the line interface circuit 150. The receiver circuit 155 performs equalization and other processing to condition the received downlink signal prior to making decisions to regenerate the transmitted downlink bit stream.

In V.90 compliant systems, the downlink signal is derived from a digital data stream in the digital modem 105 and is transmitted digitally all the way through the digital network 110 until it reaches the codec 117 in the line card 115. The DAC 120 then directly converts the downlink signal into a pulse train. The pulse train generated at the output of the DAC 120 is shaped by the logarithmic decompression law (e.g., mu-law or A-law) employed in the codec 117. The pulse train is then filtered by the LPF 125 and is coupled via the hybrid circuit 130 onto the subscriber line 137 for receipt by the analog subscriber modem 145. This type of pulse transmission system is defined in the ITU-T V.90 recommendation which is incorporated herein by reference. A similar pulse oriented transmission system (referred to as the "Townshend system" hereinafter) is described in U.S. Pat. No. 5,801,695 issued to Brent Townshend. U.S. Pat. No. 5,801,695 is hereby incorporated herein by reference. In such systems, a high-speed pulse oriented modulation protocol is used in the downlink direction to achieve data rates as high as 56 kbps. Theoretically data may be transmitted from the digital server 102 to the analog subscriber modem 145 at as much as 64 kbps, but due to digital impairments and especially FCC power restrictions, the highest rate practically achievable is 53 kbps. If line conditions are poor, still lower rates may result. In the present application, the term "high speed" thus refers to a connection speed higher than 33.6 kbps and less than or equal to 64 kbps. For example, a 53 kbps connection is a "high-speed" connection as defined herein.

The Townshend system and the V.90 systems are both asymmetric. That is, different physical layer communication protocols are defined in the downlink and the uplink directions. While the downlink uses a fast 56 kbps pulse modulation scheme, the data rate on the uplink uses a trellis coded modulation oriented physical layer signaling protocol as defined by the ITU-T V.34 recommendation. The V.34 physical layer protocol accommodates data rates no higher than 33.6 kbps. Hence in present day asymmetric 56 kbps modem architectures, the uplink data rate is on the order of 60% as fast as the downlink speed. In client-server applications such as those involving an Internet browser coupled to an Internet server, most data traffic travels in the downlink direction, so the slower uplink connection is deemed to be acceptable. Still, the acceptability of this solution is based on the assumption that the analog subscriber modem 145 is communicating with the digital network server 102, e.g., an ISP. It would be desirable to have a modem which could transmit data symmetrically or at least nearly symmetrically at 56 kbps in both the uplink and downlink directions. In addition to faster upload speeds, this would enable 56 kbps data rates to be achieved in subscriber-to-subscriber applications such as fax machines and videophones.

More generally, the "uplink direction" may be defined as the signal path direction from the analog subscriber modem 145 to the network interface 115. The "downlink direction" may be defined as the signal direction from the network interface 115 to the subscriber modem 145. This more general definition is useful in the context of the present invention whereby symmetric communication channels between subscriber modems may be established. With this definition, each subscriber modem transmits in the uplink direction to the network interface 115 via the subscriber line 137. Also, each subscriber modem receives from the downlink direction from the network interface 115 via the subscriber line 137. In a peer-to-peer connection a first subscriber modem transmits an uplink signal which is received by a second subscriber modem as a downlink signal. When the subscriber modem 145 is connected to the digital server 102, the subscriber modem still transmits in the uplink direction and receives from the downlink direction. The digital modem receives from the uplink direction and transmits in the downlink direction.

Attempts have been made to provide high-speed uplink connections. U.S. Pat. No. 5,394,437 to Ayanoglu et. al. (the "Ayanoglu system" hereinafter) defines an analytical solution which allows data rates as high as 56 kbps in the uplink direction. The main idea is to transmit a carefully pre-equalized pulse train from the analog subscriber modem in the uplink direction. The pre-equalization is designed to ensure the input to the network-interface ADC 140 samples data values which are substantially equal to the ADC 140's quantization points. An improvement to this system is provided in U.S. Pat. No. 5,406,583 to Dagdeviren. The "Dagdeviren system" as defined therein provides a means to condition a 56 kbps-uplink communication path from within the digital communication network. The main idea is to apply a code conversion within the digital network 110 to control voltage levels so as to compensate for echo effects which limit the practical application of the Ayanoglu system. No echo model is discussed in the Ayanoglu patent. As pointed out in the Dagdeviren patent, echo problems seriously limit the performance and practical usability of the Ayanoglu system. These echo problems prohibit current PCM modem technology such as defined by the V.90 standard, the Townshend system, and Ayanoglu system from being able to provide a high-speed pulse communication path in the uplink direction. Unfortunately, to correct the Ayanoglu system using the Dagdeviren system, costly call processing services involving real-time code conversions need to be integrated into the existing PSTN infrastructure. Hence deployment of the Dagdeviren system has been limited to date.

Echo cancellers are well known in the art and have been available for several decades. However, echo cancellers rely on knowledge of the transmitted signal. The echo limiting the uplink data rate is illustrated as echo path 127 in FIG. 1. The echo path 127 couples energy from the high-speed downlink data path back into the uplink data path via the line interface 130. Due to the nonlinear compression laws used in the network codec 117, a large signal pulse value transmitted in the downlink direction may give rise to an echo which causes a small uplink value to be lost. This is because the small uplink value will need to be quantized according to a closely spaced set of quantization points. When a large echo component is also present, the echo-plus-uplink signal sample will be quantized using a portion of the quantization grid where quantization points are more distantly spaced. This results in a loss of precision because the echo-plus-uplink signal will be quantized to the value of the larger echo component. When the echo is eventually cancelled in the digital modem 105, no bits of precision will remain from which to extract the uplink signal value. This effect limits the achievable data rate in the uplink direction.

A technical difficulty which has limited uplink data rates is the inability of prior art subscriber modems and PCM codecs to cancel an echo at the input to the network-interface ADC 140. Echo cancellation traditionally occurs within the digital modem 105 is and the analog subscriber modem 145. These modems are located at the telephone connection's endpoints. Prior art adaptive echo cancellers can cancel an echo as seen from the modem endpoints, but not at the inaccessible point in the network codec 117 prior to the codec's ADC 140. Also, intersymbol interference needs to be minimized so that it does not impair the ability of the network-side codec to sample a pulse signal at its proper values. Moreover, symbol timing recovery at the network codec may drift from the sample clock used within the analog subscriber modem 145. Hence it is difficult at best to generate signals which will be locked to the sample clock and quantization levels of the network-interface ADC 140.

It would be generally desirable to transmit data at a higher speed in an uplink direction across a telephone line terminated at the network side by a PCM codec. For example, this would provide improved upload speeds and enable high-speed symmetric communication channels for use in applications such as facsimile and video telephony. It would be desirable to have a low cost enhanced network codec which enables highly reliable symmetric 56 kbps modem connections. It would also be desirable to have an echo canceller which could be built into one or more modem endpoints to cancel an echo at the network codec 117, thus allowing data to be transmitted at 56 kbps in both the uplink and downlink directions without the need to modify the network codecs located within the telephone system. Moreover, it would be desirable to have systems and training procedures to allow digital and/or subscriber modems to cooperatively train by sending probing signals and adjusting their parameters so as to provide symmetric 56 kbps connections. New forms of adaptive signal processing structures are needed to configure and operate a remote-echo canceller to cancel an echo as measured at the input to a network codec's ADC using signal processing only within the modem endpoints.

SUMMARY OF THE INVENTION

The present invention solves these and other problems by providing systems and methods to enable high-speed symmetric modem connections between digital and analog modems or pairs of analog subscriber modems. An enhanced PCM codec with digital signal processing capabilities is developed to allow the uplink to be operated at 56 kbps or up to 64 kbps in some cases. The enhanced network codec cancels echoes as seen at the network codec 117's ADC 140 input. One aspect of the present invention incorporates an echo canceller structure into an enhanced PCM codec architecture. An uplink signal receiver capability is built into the enhanced PCM codec to allow it to process both speech and high-speed (e.g., 56 kbps) uplink modem signals. The enhanced PCM codec of the present invention may be embodied on a single semiconductor die and packaged to be plug-compatible with existing codecs. This allows an existing network-interface card to be upgraded at a minimum cost and effort to create an enhanced network interface capable of supporting bi-directional 56 kbps traffic. A enhanced 56 kbps bidirectional modem for use with the enhanced PCM codec and associated cooperative training procedures are also developed.

In a first aspect of the present invention, an enhanced codec apparatus for use in a network interface line card is developed. This apparatus includes a digital signal processor circuit, and a digital interface port with a first coupling to the digital signal processor circuit and a second coupling to a digital network. The enhanced codec also includes a digital conversion subsystem comprising a DAC and an ADC coupled substantially as the DAC 120 and the ADC 140 in FIG. 1. The enhanced codec also includes an echo canceller-processing module. This echo canceller is operative to cancel an echo component leaking from the analog output of the DAC back into the analog input of the ADC via, for example, the line interface 130. The enhanced codec also includes a mapping function which can be embodied as a pulse decoder-processing module. This pulse decoder-processing module is operative to regenerate a PCM data stream derived from the echo canceller output signal. The PCM data stream may contain information representative of both an analog waveform or a digital bit stream, for example a 56 kbps-bit stream encoded into a 64 kbps PCM data stream. The resulting PCM data stream is coupled for transmission to the digital network via the digital interface. The enhanced codec thereby enables high-speed digital communication in an uplink direction using a POTS channel of a subscriber line. This is useful for enabling increased upload speeds or to symmetric 56 kbps peer-to-peer subscriber communications.

A second aspect of the present invention focuses on another enhanced codec apparatus. This apparatus includes a DAC, and an ADC. The enhanced codec also includes a mapping function module. An echo canceller is also included which is operative to cancel an echo component leaking from the analog output of the DAC back into the analog input of the ADC via, for example, the line interface 130. The mapping function module is operative to selectively convert a digital representation of an uplink-analog signal to one of a PCM waveform representation and a decoded bit stream inserted into a PCM data stream.

A third aspect of the present invention, deals with subscriber modem which is coupleable to the POTS channel of a subscriber line and is operative to communicate with an enhanced codec. This modem includes a high-speed uplink transmitter coupled to transmit a high-speed modem signal onto the POTS channel of said subscriber line for reception by the enhanced codec. When this transmitted uplink waveform is received by the enhanced codec, it is converted to a PCM data stream capable of carrying 56 kbps in the uplink direction. This modem may optionally involve training procedures used to configure parameters within the enhanced codec.

A fourth aspect of the present invention deals with a method of processing for use in an enhanced codec. A first step of this method involves monitoring signal traffic occurring at a network interface between a digital network and the POTS channel of a subscriber line. A second step involves detecting a signal protocol indicative of the use of a high-speed uplink protocol on the POTS channel. When detection indicates the high-speed uplink protocol is to be used, the method involves enabling an echo canceller and a pulse decoder to receive from the POTS channel an uplink signal using the high-speed uplink protocol.

In another aspect of the present invention a method of processing for use within an enhanced codec is developed.

This method involves receiving a training signal from a subscriber line, adjusting a set of uplink signal processing parameters in response to the training signal, and operating an uplink communication connection on the POTS channel of the subscriber line. In this method, a high-speed data stream is extracted from an uplink-analog waveform, encoded into a PCM data stream, and transmitted to a digital network. Other aspects of the present invention deal with similar methods carried out in the subscriber modem while in communication with the enhanced codec.

BRIEF DESCRIPTION OF THE FIGURES

The various novel features of the present invention are illustrated in the figures listed below and described in the detailed description that follows.

FIG. 1 is a block diagram representing a prior art communication system for transferring information between a digital modem and an analog subscriber modem.

FIG. 2A is a block diagram illustrating an apparatus capable of canceling a downlink echo to allow a 56 kbps-uplink connection speed.

DETAILED DESCRIPTION OF THE PREFERRED EMBODIMENTS

Figure 2B:
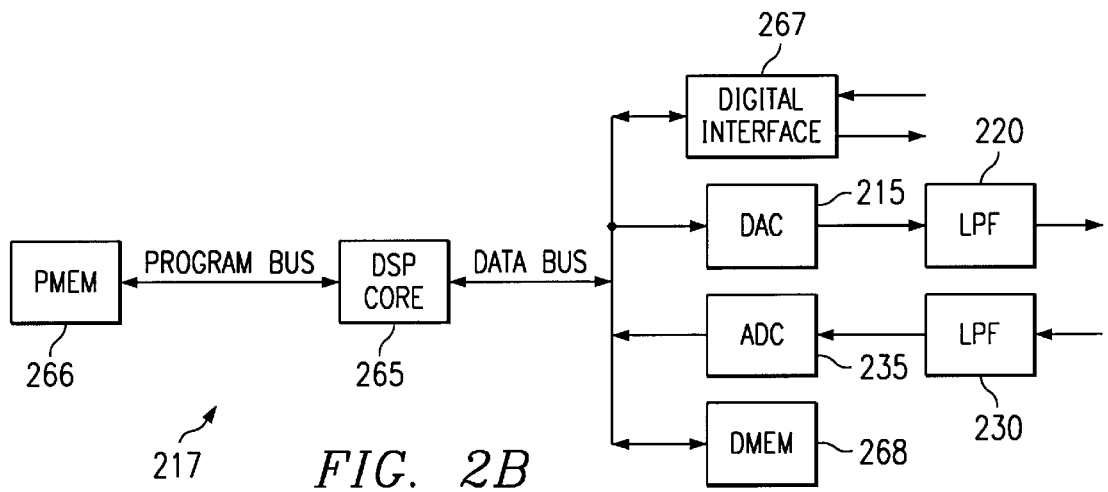
FIG. 2B is a block diagram illustrating a physical digital processing structure of an apparatus capable of canceling a downlink echo to allow a 56 kbps-uplink connection speed.

With reference to FIG. 2A, an illustrative embodiment of a network line card 200 configured according to an aspect of the present invention is shown. The line card 200 is preferably installed in network interface equipment located within a local exchange carrier (LEC) premises to provide an interface to the analog subscriber line 137. A LEC is in general any telephone company which provides telephone connections to local subscribers. The analog subscriber line 137 is also known as a "POTS" connection which stands for "plain old telephone service." The line card 200 provides a standard analog line interface to the analog subscriber line 137 (POTS) and also provides signal processing needed to enable high-speed uplink data communication. The line card 200 may be embedded within a digital subscriber line (DSL) modem which provides a separate POTS channel. That is, the line card 200 enhances the POTS channel of a subscriber line when the subscriber line also supports a higher frequency out-of-POTS-band DSL physical layer protocol. As used herein, the "POTS channel" refers to either the entire analog subscriber line or the standard POTS channel embedded within a DSL protocol. The POTS channel may be separated from the digital transmission portion of the DSL physical layer signal using either a splitter or a splitterless DSL protocol as are known in the art. Also, the POTS channel as defined herein may have a passband extended somewhat beyond the standard definition when preequalization is applied. However, the POTS band may not extend more than substantially twice the normal definition (i.e. substantially beyond 8000 Hz) whereby the domain of DSL is entered.

The line card 200 is connected into a communication configuration in the same way as the network interface 115 is connected as shown in FIG. 1. The line card 200 is preferably implemented as a direct plug-compatible replacement for the network interface 115 which is also typically implemented as a line card. The line card 200 includes an enhanced codec 217 which is built according to the present invention. Preferably the enhanced codec 217 is built onto a standard semiconductor package so as to be pin compatible with the prior art codec 117. Hence in one type of preferred embodiment, a line card of the network interface 115 may be upgraded to the line card 200 by replacing the codec 115 with the enhanced codec 217. As discussed below, various types of enhanced digital signal processing codecs which include echo cancellation functionality are known in the art and are typically used in acoustic echo cancellation. An example is the CS6403 from Crystal Semiconductor, Inc. Echo cancellers are also incorporated onto various network DSL interfaces to provide higher uplink data rates on digital subscriber line connections. For example, FIGS. 2–16 of page 75 of "Subscriber line signaling handbook—digital" by Withham D. Reeve illustrates an ISDN DSL interface. The present invention provides an alternative network receiver structure for use on POTS lines or POTS channels of DSL lines.

Enhanced digital signal processing codecs which provide integrated line card functionality are also known. For example the MuSLIC™ and the B-MuSLIC™ from Siemens Microelectronics Inc. integrate line card features onto the same die as a codec using digital signal processing technology. The enhanced codec of the present invention is useful in network echo canceling and provides functionality and structure needed to improve uplink data rates, especially in pulse modem protocols as employed in the Townshend system and in V.90 compliant modems. Like the aforementioned Siemen's systems on a chip, the line card 200 may be integrated onto a single semiconductor die to support one or more channels of fully functional line card interfaces. These additional line card features as defined by the BORSCHT model and variants of the DSLAM architecture are known and is not be detailed herein. See for example the Siemens product literature for the aforementioned systems on a chip for more information. These types of semiconductor DSP line-card codecs may be enhanced according to the present invention to support high-speed uplink communication on the POTS channel of the subscriber line 137.

In the illustrative embodiment, the line card 200 is coupled to receive an input from the digital network 110. This input is coupled to an optional protocol detect module 207 and a first mapping function 205 which is preferably implemented using a look-up table. For example, the first mapping function 205 converts mu-law data to linear data. In some cases this mapping function may compensate for robbed-bit signaling or digital attenuation effects which represent digital impairments in the digital network 110. Examples of such mapping functions are discussed in U.S. Pat. No. 5,761,247, U.S. Pat. No. 5,729,226 and U.S. Pat. No. 5,812,075, all to William L. Betts of Paradyne Corp. Related digital impairment compensation approaches based on constellation mapping are defined in the V.90 recommendation. The output of the first mapping function 205 is coupled to a second mapping function 210. The second mapping function 210 is optional and puts the received digital data in a format for conversion by a DAC 215. For example. if the first mapping function 205 supplies digital-impairment corrected 16-bit linear data and the DAC 215 accepts 8-bit mu-law data, the second mapping function 210 may be embodied as a look-up table which maps the 16-bit linear data back to a set of mu-law values. The output of the first mapping function 205 is also coupled to the X-input of an adaptive filter 240. The adaptive filter 240 has an adaptive weight vector W which is preferably adapted to cancel an echo as is discussed subsequently. The output of the DAC 215 is preferably coupled to the input of a reconstruction and line filter 220. The reconstruction filter 220 outputs a signal which is derived from the signal applied to its input. The filter 220 attenuates frequency components of the input signal to produce an output whose frequencies are limited to a frequency range, for example from 250 Hz to 3500 Hz. The output of the filter 220 is coupled to an input port of a line interface circuit 225 which is preferably implemented using a hybrid transformer and electronic amplifiers as is well known in the art. The line interface circuit 225 couples an analog downlink signal output from the filter 220 onto the subscriber line 137. The line interface circuit 225 also couples a received analog uplink signal from the subscriber line 137 to an output port directed to the input of an antialiasing and line filter 230. The filter 230 may be designed to have a passband in a desired range such as from 250 Hz to 3500 Hz, for example. The output of the filter 230 is coupled to the input of an ADC 235. The ADC 235 preferably produces a high precision linear output, for example, 16 bits. The ADC 235 may be implemented with a nonlinear characteristic followed by a mapping function to convert the nonlinear output to a linear format. In some systems, nonlinear processing may be applied, however in the preferred embodiments of the present invention processing is performed using linear data formats and the ADC 235 is preferably a linear converter. In some embodiments, such as when the line card 200 is embedded into a DSL modem, alternative line filtering configurations may be used. For example, the ADC may sample a signal received directly from the line interface 225 and apply digital filtering and downsampling to generate the equivalent to the output of the ADC 235.

The output of the high precision ADC 235 is coupled to a subtractor 242 which subtracts the output of the adaptive filter 240 from the ADC 235's output. This input to the subtractor 242 is designated as the D-input to the adaptive echo canceller which comprises the adaptive filter 240 and the subtractor 242 as well as training and some control logic. The output of the subtractor 242 is coupled to an optional equalizer 245. The output of the subtractor 242 is the output of the echo canceller. The output of the equalizer 245 is coupled to a third mapping function 250. The output of the third mapping function 250 is coupled to the digital network 110 to be sent back to the digital modem 105, or in general, a far-end modem. The third mapping function 250 may be a simple table look-up, or may involve more complex processing such as pulse decoding and bit stream regeneration as performed in the downlink channel of a V.90 subscriber modem.

The third mapping function 250 may also optionally perform preprocessing to account for digital impairments which are found to distort data sent through the digital network 110. In the preferred embodiment, the third mapping function 250 involves digital signal processing operations which are performed at a sample rate higher than the sample rate of a PCM data stream which is 8000 Hz. For example, the equalizer 245 and the third mapping function 250 may receive a 16000 Hz 16-bit sample stream and produce an 8000 Hz 8-bit PCM data stream therefrom. Note the 16000 Hz-sample rate is greater than twice the nominal filtered bandwidth of the subscriber line which is approximately 3500 Hz–250 Hz=3250 Hz.

In various embodiments, the pulse decoder (embodied as a special case of the third mapping function 250) produces an output data stream which has the same number of bits per sample and the same data rate as PCM data, but directly represents a digitally encoded data stream. This is similar to the encoding used in the downlink connection of a V.90 compliant modem. As used herein, the term "PCM data stream" thus refers to a data stream whose sample rate and number of bits per sample is substantially equal to the sample rate and number of bits per sample in a PCM data stream. In terms of the PSTN, a PCM data stream has a bit rate of 64 kbps, although may carry less information due to robbed bit signaling and other impairments. In the contexts of the enhanced codec 217, the PCM data stream may be used to transmit a digital representation of an analog waveform (according to standard PCM voice transmission techniques). Alternatively, the PCM data stream may carry an encoded bit stream similar to the bit stream generated in the digital modem 105 to represent the V.90 downlink signal. Hence the enhanced codec 217 according to the present invention is able to process standard analog waveforms such as speech, but is also able to process high-speed pulse-encoded waveforms to regenerate a high-speed uplink bit stream as transmitted from an enhanced subscriber modem. The mapping function module 250 is thus operative to selectively convert a digital representation of an uplink-analog signal to one of a PCM waveform representation and a decoded bit stream inserted into a PCM data stream.

The pulse decoder (250) may in general operate on other types of physical layer to modem signals such as QAM signals which are coupled onto a POTS subscriber line using a standard PCM oriented line interface. Unlike a DSL interface such as used on an ISDN line, the line card 200 can directly process both POTS-band analog signals and POTS-band pulse-coded signals to provide both standard interface for legacy devices and increased uplink speeds for newer devices attached to the POTS channel of the subscriber line 137.

The enhanced codec 217 is preferably implemented using a single semiconductor die and is preferably packaged to be plug-compatible with the existing network codec 117. Such an embodiment is illustrated in FIG. 2B. Referring to the specific exemplary embodiment of FIG. 2B, the enhanced codec 217 includes a digital signal processor (DSP) core 265 which employs a Harvard architecture. One example of such a DSP core is the Oak™ DSP Core available from DSP Group Inc. The DSP core 265 is coupled to a program memory (PMEM) 266 via a program bus and executes an instruction stream received therefrom. The DSP core 265 is also coupled to one or more data busses (only one shown). The data bus is coupled to transmit and receive digital data to and from the digital network 110 via a digital network interface port 267. The data bus is also coupled to receive digital data which has been converted by the ADC 235. The data bus is also coupled to transmit digital data to the DAC 215. The data bus is also coupled to a data memory 268. The DSP core 265 itself may additionally include one or more register files. In many embodiments, the PMEM 266 and the DMEM 268 and related bussing structures are provided as a part of the DSP core 265 (for example in the aforementioned Oak™ core). Equivalently, the enhanced codec 217 may be constructed using a Von Nuemann computer architecture or other known computer architectures to include hard-wired processing configurations as may be designed in custom or gate array logic. The line card 200 may also be embodied using other equivalent configurations such as one designed using a discrete-component signal processor such as a TMS320C50™ by Texas Instruments Inc. The digital signal processor is then preferably operatively coupled to a high precision linear codec circuit. In an embodiment preferred at this time, the enhanced network codec 217 is implemented on an ASIC using the structure illustrated in FIG. 2B. The various the functional blocks of the enhanced codec 217 as shown in FIG. 2A may then be implemented as software routines executing on the DSP core 265 or via table look-ups from on-board memory blocks. For example, the protocol detect module 207 may be viewed as a processing module which is embodied as a software routine in the PMEM 266 and is thereby controllably coupled to the DSP core 265. It is also preferred at this time to embody the PMEM 266 as a nonvolatile and reprogrammable device. This allows new protocols and signal processing techniques to be accommodated after the initial deployment of the line card 200 into a LEC's equipment. Software upgrades may be downloaded, for example via the digital network interface 267 and loaded into the PMEM 266 using data-to-program move instructions or a specialized program-memory loader state machine upon the detection of a specialized network management sequence.

Referring again to FIG. 2A, due to impedance mismatches between the hybrid circuit 225 and the subscriber line 137, an echo 227 is produced which couples some of the analog signal output from the reconstruction filter 220 back into the filter 230. In operation, the adaptive filter 240 is trained to remove the echo component from the ADC 235's output. For example, the ADC 235 may be implemented using 13-bits or more of linear precision so that the output of the subtractor 242 supplies a received signal where the echo has been removed but the uplink signal has not been lost. Because of the linearity of the ADC 235, the aforementioned loss of precision due to nonlinear quantization effects may be reduced. The optional equalizer 245 is preferably used to minimize the need for pre-equalization by the subscriber modem 145 when it sends its analog uplink signal on the subscriber line 137. With the line card 200, a network line interface is constructed which performs processing similarly to the downlink-receiver circuits in a V.90 subscriber modem. Preferably, the sample rates of the DAC 215 and the ADC 235 are set to 16000 Hz, and the equalizer 245 also performs clock recovery to synchronize the sampling clock of the ADC 235 to the subscriber modem's transmit clock as is known in the art of PCM modem design. Alternatively, the third mapping function 250 may also perform digital impairment correction and downsampling.

The line card 200 thus enables a high-speed pulse physical layer modem protocol to be used in the uplink direction. Using the line card 200, the same principles as are applied in the V.90 downlink connection may be also applied in the uplink direction. This allows high-speed pulse communications as presently used in the downlink of V.90 modems to be used to increase upload speeds or to enable improved performance in peer-to-peer and/or symmetric applications such as facsimile machines and video telephony connections. Meanwhile, the line card 200 allows voice signals to be processed with or without echo cancellation and equalization. Using the enhanced codec 217, the line card 200 thus provides a PCM signal interface structure for both voice and high-speed modem signals.

Depending on the operation of the equalizer 245 and the third mapping function 250, the enhanced codec 217 may be used to process both voice and pulse data signals. In one embodiment, the protocol detector 207 is present and is operative to monitor protocol handshake signals. When a call with a given set of protocol handshake signals is detected, the enhanced codec 217 determines pulse communications are to be established. Otherwise, the apparatus may optionally disable its equalizer and alter the operation of the third mapping function 250. For example, when pulse-data communication signals are present the third mapping function 250 outputs a bit stream of demodulated information. When voice communication signal are present, the third mapping function 250 simply supplies, for example, mu-law PCM data. When certain protocol sequences are detected the protocol detect module 207 can be configured to direct the echo cancellation module (240, 242) to initiate a training sequence by sending a known data stream via the DAC 215 and measuring a return echo at the ADC 235 to minimize the energy of the echo canceller output (output of the subtractor 242.) Likewise, When certain protocol sequences are detected the protocol detect module 207 can be configured to direct the equalization module 250 to adapt an equalizer model to compensate for the transfer function between the subscriber modem 145 and the input to the ADC 235.

The protocol detect module 207 also preferably includes its own management protocol to communicate with a digital modem connected to a network management node. The management protocol allows new control programs to be loaded into the enhanced codec 217 so the enhanced codec 217 can be upgraded to support new signaling and physical layer protocols. It is contemplated that new uses beside symmetric V.90 connections may be supported by the enhanced codec 217. When two analog subscribers are connected to each other via the digital network 110, and both are connected to subscriber lines such as the subscriber line 137 via line cards comprising the enhanced codec 217, these two analog modems may communicate in both directions using a 56 kbps data rate. Similarly, facsimile machines may communicate with one another using 56 kbps data connections when both machines are connected to the digital network via the enhanced codec 217. Similarly, H.320, H.323 and similar video telephones may be connected across the digital network 110 to enable high-speed bidirectional communications when both video phone endpoints are connected via line cards employing the enhanced codec 217. Any of these functions may be equivalently performed using the POTS channel of a DSL.

In other applications, the protocol detector 207 is not present. In such systems, the enhanced codec 217 is operative to correct all signals in essentially the same manner. Since the analog channel carries a PCM signal which is confined to a set of quantization values, the enhanced codec 217 simply regenerates the mu-law codes which best correspond to the set of values transmitted by the subscriber device as detected after the echo has been cancelled and the uplink signal has been optionally equalized.

Figure 2C:
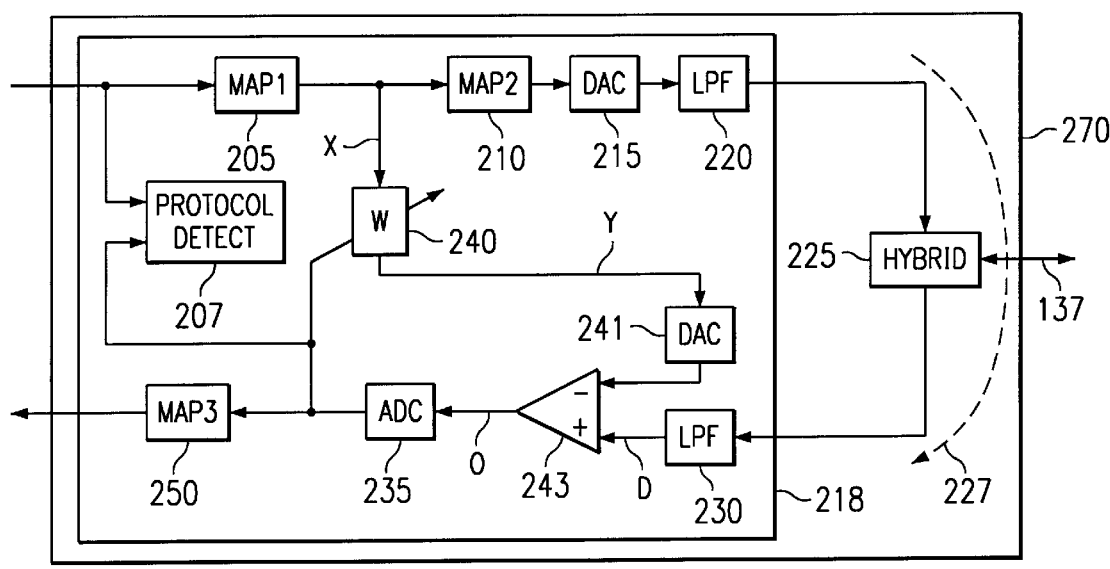
FIG. 2C is a block diagram illustrating an alternative apparatus capable of canceling a downlink echo to allow a 56 kbps-uplink connection speed.

With reference now to FIG. 2C, an alternative embodiment, a line card 270 is illustrated. This apparatus represents a modified version of the line card 200 and may be implemented with a physical architecture similar to the one shown in FIG. 2B. In the embodiment 270, the output of the echo canceller 240 is coupled to a second DAC 241.

The output of the DAC 241 is subtracted via an analog circuit 243 which is preferably implemented as an analog differential amplifier circuit. In this embodiment the echo is cancelled prior to analog-to-digital conversion by the ADC 235. In this embodiment the ADC 235 may be implemented as a low cost mu-law converter since linear processing is not required. The ADC 235 may also be sampled at an 8000 Hz rate. The third mapping function 250 may optionally be used to post-process the signal. For example, in some embodiments of this type of system the ADC 235 may sample data at 16000 Hz and use a linear conversion. In such as system, the third mapping function 250 may perform clock recovery, filtering and downsampling to 8000 Hz. The third mapping function 250 may also involve a linear to mu-law or other similar data format conversion. The third mapping function 250 may provide compensation for digital impairments such as robbed bit signaling. Also, the third mapping function 250 may optionally provide equalization similarly to the equalizer 245.

In an alternative equivalent embodiment of the line card 270, the analog circuit 243 may be moved in front of the filter 230. In this case a filtered-X LMS or similar algorithm is preferably used to train the adaptive filter 240. Filtered-X LMS (also called FXLMS) algorithms are described in the book "Active noise control systems, algorithms and DSP implementations," by S. M. Kuo and D. R. Morgan, published by Wiley Interscience in 1996. This book provides background information relating to some mathematical and algorithmic techniques taught herein.

One advantage of the line card 270 is its ability to provide a low cost system for uplink echo cancellation. In a low cost embodiment, the ADC 235 samples at 8000 Hz and provides mu-law data directly to the network. This low cost embodiment only uses the protocol detect module 207 to detect times where the adaptive filter 240 of the echo canceller may be trained. In some embodiments the protocol detect module 207 involves only an energy detector to determine when no signal is present from the near-end subscriber connected to the subscriber line 137. The third mapping function 250 may then optionally be eliminated. In such systems, it is up to the an enhanced modem as discussed hereinbelow to maintain synchronization and pre-equalize its transmit signal so the ADC 235 properly samples a 56 kbps data stream at the appropriate sample instants. Meanwhile, the line card 270 eliminates the echo problems which limited prior art uplink pulse communication systems. It should also be noted the architectures of the line card 200 and the line card 270 may be used to provide other types of pulse signaling protocols beside V.90.

The enhanced codec 217, 218 of the present invention has several preferable characteristics. The enhanced codec 217, 218 includes the digital signal processor circuit which may be implemented in various ways, to include the DSP core 265. The enhanced codec 217 also includes a digital interface port with a first coupling to the digital signal processor circuit and a second coupling which may be coupled to the digital network 110. The enhanced codec 217, 218 also involves a digital conversion subsystem to include the DAC 215 and an ADC 235. These converters may be designed to have any specified sample rate, bit precision, and/or linearity and the like as dictated by the needs of a given application. The DAC 215 has a digital input coupled to receive a digitally encoded signal sample from, for example the DSP core 265, the DMEM 282 (via DMA) or the digital interface 267. The DAC 215 has an analog output coupled to a first analog signal port which couples to the line interface circuit 225. The filter 220 may optionally be interposed between the DAC 215 and the line interface circuit 225. The ADC has an analog input coupled to a second analog signal port. The second analog signal port is coupled to the line interface 225. The filter 230 may be optionally interposed between the ADC 235 and the line interface 225. The ADC 235 has a digital output coupled to the digital signal processor circuit as embodied by the DSP core 265, for example.

The enhanced codec 217, 218 also includes an echo-canceller-processing module which is controllably coupled to the digital signal processing circuit. For example, the echo-canceller-processing module resides as a software program in the PMEM 266 and implements the echo canceller functionality as shown by the adaptive filter 240 and the subtractor 242. The echo-canceller-processing module is thus operative to cancel an echo which leaks from the output of the first analog signal port back into the input of the second analog signal port. The enhanced codec 217, 218 also includes a pulse-decoder-processing module which is controllably coupled to the digital signal processing circuit. For example, pulse decoder processing module resides as a software program in the PMEM 266 and implements the third mapping function 250's functionality to regenerate a PCM data stream derived from the echo canceller output signal. The PCM data stream involves a 8000 Hz sample rate where samples take on 8-bit PCM values. However, the enhanced codec actually encodes binary information derived from the pulse amplitude information of a high-speed uplink modem signal transmitted over the subscriber line 137 to the enhanced codec. The equalizer 245 may optionally be interposed between the o-port of the echo canceller (subtractor 242 output) and the input to the third mapping function 250. The equalizer 245 may optionally include a clock recovery circuit. In the enhanced codec 217, 218, the output/recovered PCM data stream is coupled for transmission to the digital network 110 via the digital interface 267. The enhanced codec 217, 218 thereby enables high-speed digital communication in an uplink direction using the POTS channel of the subscriber line 137. This high-speed communication allows speeds as high as 64 kbps to be transmitted on a PCM channel under ideal conditions. Typically only 56 kbps may be realized due to impairments such as robbed-bit signaling in the digital network 110, and often only 53 kbps may be realized due to regulations such as FCC power restrictions.

Figure 2D:
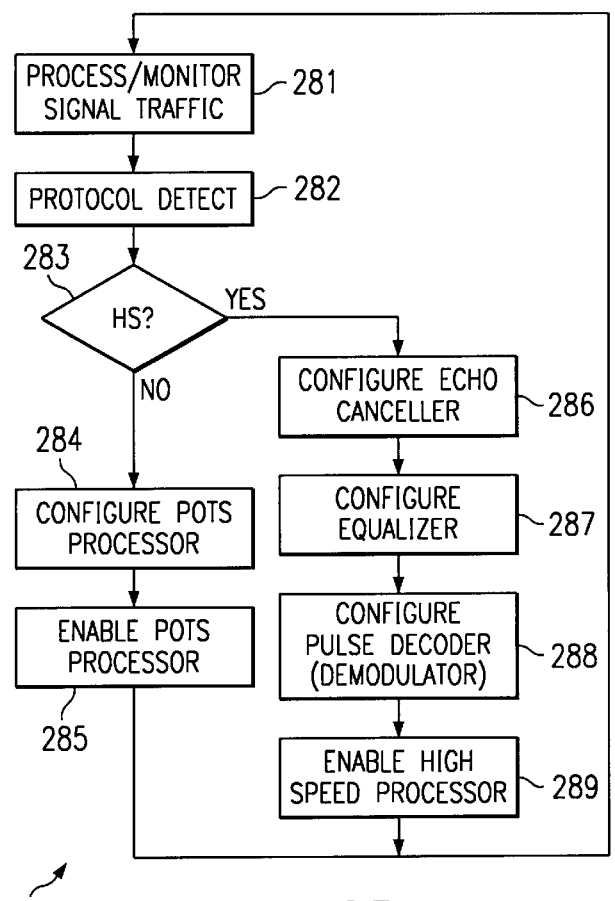
FIG. 2D is a flow chart representative of a method of processing carried out by an enhanced codec of the present invention.

With reference now to FIG. 2D, a method 280 of processing for use in the enhanced codec 217, 218 and the line card 200, 270 is presented. In a first step 281 signal traffic is processed through the line card 200, 270 back and forth between the digital network 110 and subscriber line 137 (POTS channel). In the first step 281 the protocol detect module 207 also monitors this signal traffic. Control stays in the first step 281 until a protocol sequence is detected. The protocol sequence is detected as a part of the monitoring process which occurs in the step 281. This monitoring may be performed in hardware, via dedicated programmable state machines (e.g., FPGA sequence detection circuits) or in software. When the monitoring determines a protocol sequence to be present, control passes to a second step 282. In the second step 282 it is determined what type of protocol sequence has been detected. Based on a decision 283, it is determined whether a high-speed protocol needs to be used. If not, control flows to a third step 284 which configures the enhanced codec 217 to process normal POTS traffic. Next control flows to a fifth step 285 where a POTS processing module is enabled and then control flows back to the first step 281.

When the decision 283 determines high-speed protocol processing is needed, control flows to a fifth step 286. In the fifth step 286, the echo canceller (240, 242) is configured. This may involve one or more training phases whereby the coefficients of the adaptive filter 240 are adjusted in response to the transmission of a training signal. Next control passes to an optional sixth step 287 whereby a set of equalizer 245 coefficients are trained to compensate for the transfer function between the transmitter (340 as defined herinafter) of an upgraded version of the subscriber modem 145 and the input to the ADC 235. Clock recovery may also be performed in conjunction with the operation of the equalizer. Control next passes to a seventh step 288 whereby the pulse decoder of the third mapping function 250 is configured. This may involve training phases whereby the enhanced codec 217, 218 and the subscriber modem 145 agree upon a set of coding values to be used to define a signal constellation for use in the physical layer protocol therebetween. Control next passes to an eighth step 289 whereby a high-speed uplink-processing module is enabled. Control next passes back to the first step 281.

The method 280 may be broken into several sub-methods embedded therein. For example, in one version of the method 280 involves the first step 281 which monitors signal traffic occurring at a network interface between a digital network and the POTS channel of a subscriber line. This sub-method also involves the second step 282 which in this sub-method detects a signal protocol indicative of the use of a high-speed uplink protocol on said POTS channel. Based on the decision 283, when said step of detecting indicates said high-speed uplink protocol, control passes to the fifth step 286 whereby the echo canceller 240, 242 is enabled. Next control passes to the eight step 288 and then to the ninth step 289.

Figure 3A:
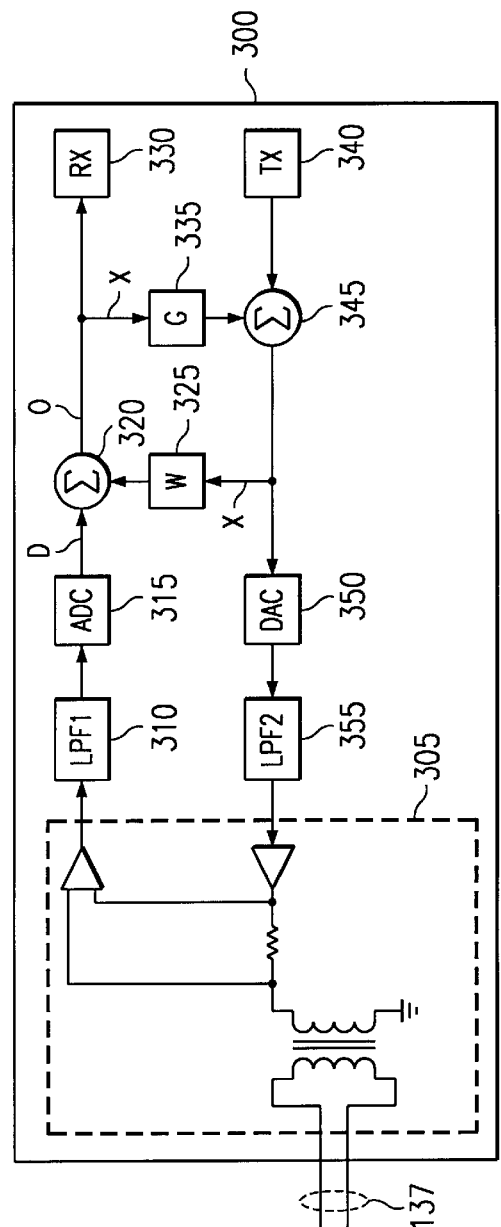
FIG. 3A is a block diagram illustrating a subscriber modem which enables an increased uplink speed using a remote-echo cancellation technique.
Figure 3A:
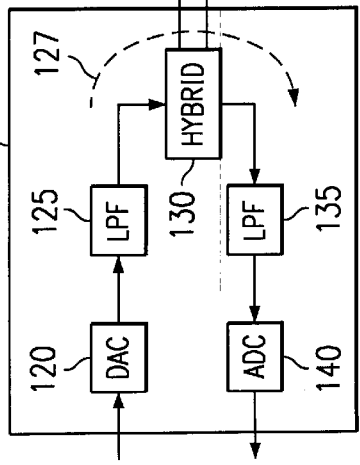
Figure 3B:
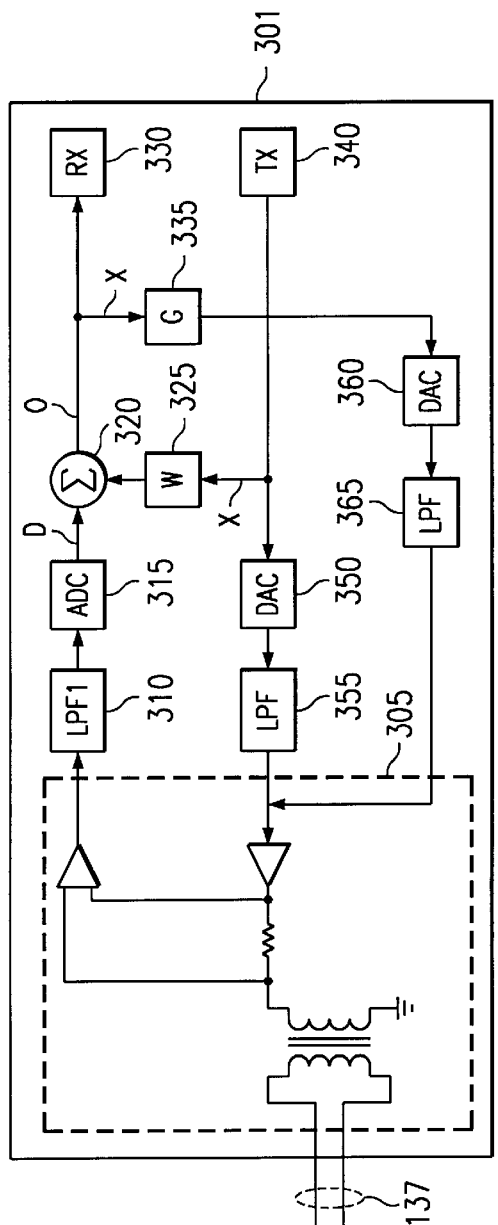
FIG. 3B is a block diagram illustrating an example of an alternative embodiment of a subscriber modem which enables an increased uplink speed using a remote-echo cancellation technique and uses separate reconstruction filters for transmitting a modem signal and a remote-echo cancellation signal.
Figure 3B:
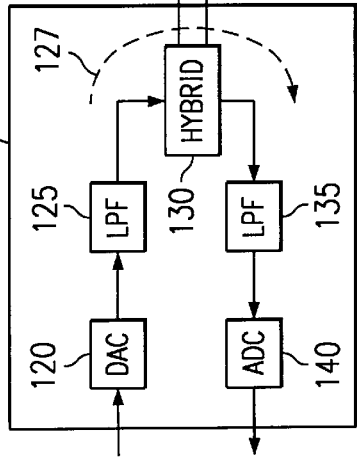

With reference now to FIG. 3A and FIG. 3B, a subscriber modem 300, 301 is illustrated which has uplink echo cancellation capabilities. The subscriber modem 300, 301 may be used as a computer modem or may be embedded within another type of communication device such as a facsimile machine or a video telephone. The subscriber modem 300 is provided to enable uplink data communication at speeds approaching 56 kbps where the subscriber modem is connected to a standard network interface such as the line card 115. The subscriber modem 300, 301 enables increased uplink data rates without the need to deploy new line cards or enhanced codecs into existing line cards with in the various LEC's located around the world. That is, according to an aspect of the present invention, a remote-echo canceller 335 is incorporated into a modem endpoint to achieve essentially the same result as provided by the enhanced codecs 217 and 218 without the need for any extra investment in network infrastructure equipment. This type of embodiment involving the remote-echo canceller 335 is discussed in greater detail hereinbelow.

In an alternative type of embodiment, the enhanced codecs 217, 218 may be used to simplify the structure of the subscriber modem 300. The enhanced codecs 217 and 218 typically operate with a superior noise margin due to their ability to recover a clock locally, perform equalization locally, and locally regenerate and echo cancellation signal. Hence the codecs 217 and 218 can provide increased noise margin when compared to the subscriber modem 300, 301 being used with the remote-echo canceller 335 coupled to the standard codec 117. However, for subscriber lines which are reasonably well conditioned, the subscriber modem 300, 301 can sustain the same data rate when interfaced to the codec 117 without the need to alter the infrastructure of the digital network 110.

When used with the enhanced codec 217, 218, a simplified embodiment of the subscriber modem 300 may be implemented without the remote-echo canceller 335. This version of the modem 300 differs from prior art asymmetric 56 kbps modems due to the use of a modified transmitter 340 which uses a high-speed uplink communication protocol. Also, this version of the modem 300, 301 involves circuits which cooperate with the enhanced codec 217, 218 to establish both a high-speed uplink connection and a high-speed downlink connection using the POTS channel of the subscriber line 137. The subscriber modem apparatus preferably also includes a protocol module which is operative to transmit a training signal to the enhanced codec 217, 218 so as to allow the enhanced codec 217, 218 to configure a set of adaptive signal processing parameters contained therein. The protocol module is not shown but is typically implemented as a part of the enhanced modem transmitter module 340.

Figure 2E:
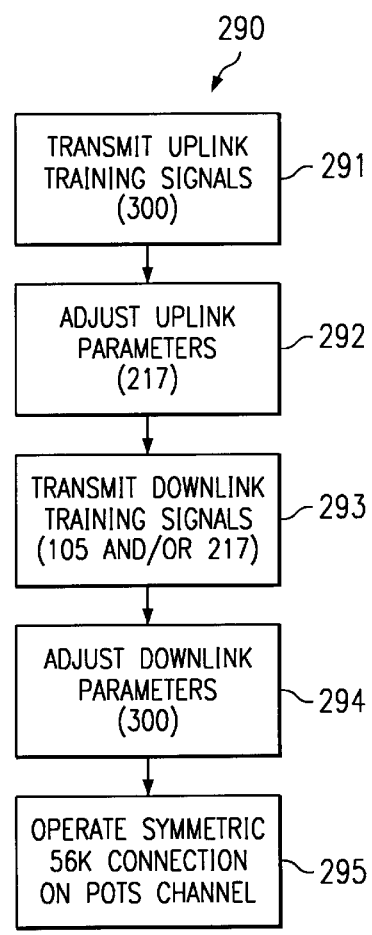
FIG. 2E is a flow chart representative of a method of processing for training signal processing apparatus to cancel echoes and provide symmetric 56 kbps uplink speeds for systems involving enhanced codec apparatus.

Referring to FIG. 2E, a method 290 of processing for use in this type of embodiment of the subscriber modem 300 is illustrated in block diagram form. In this type of embodiment, the subscriber modem 300 is coupled to the enhanced network codec 217, 218 so no remote echo canceller 335 is needed. The method may be applied to similar systems whereby two modem endpoints communicate and a network codec provides signal processing functions for uplink signal reception and downlink echo cancellation. In a first step 291, a training signal is sent from the subscriber modem 300 to the enhanced codec 217. In a second step 292, the enhanced codec 217, 218 adjusts its uplink adaptive signal processing parameters. These may involve the coefficients of the echo canceller 242, the equalizer 245 and a set of constellation and/or mapping parameters for the third mapping function 250. In a third step 293, a set of downlink training signals are transmitted from the far end modem (e.g., the digital modem 105) or the enhanced codec 217, 218 to the subscriber modem 300. In a fourth step 294, the subscriber modem 300 adjusts its downlink adaptive signal processing parameters. These parameters include, for example, equalizer parameters and signal constellation parameters. In a fifth step, the subscriber modem 300 operates a high-seed uplink communication channel using the POTS channel of the subscriber line 137 and communicates with a far end modem via the enhanced network codec 217, 218. For example, a 56 kbps connection may be sustained capable of carrying data at 56 kbps simultaneously in both the uplink and downlink directions under favorable channel conditions.

While FIG.'s 3A and 3B illustrate operational signal processing structures within a modem, it should be noted these operational signal processing structures may be implemented with programmable hardware similar to that shown in FIG. 2B. In the subscriber modems 300, 301, the digital network interface 267 will typically be substituted with an interface to a serial port or computer bus to communicate with a local host processor such as a Pentium™ Processor available from Intel Corp. In some systems the processing as carried out in the DSP core 265 may be carried out by the host processor of the local host computer to perform the so-called "host signal processing." The various blocks of the modem structures 300, 301 such as the receiver module 330 may be implemented as software routines controllably coupled to a programmable digital signal processing circuit such as the DSP core 265 or the host processor. For example, the remote-echo canceller 335 may be viewed more generally as a "feedback module." This feedback module may be implemented using dedicated circuits or as a subroutine which is controllably coupled to the DSP core 265 or a host processor and is operatively coupled as illustrated in FIG. 3A and FIG. 3B. In some systems, the modem apparatus 300, 301 may be built directly into a dedicated device such as a facsimile machine or a videophone. In such embodiments the control and modem signal processing tasks may be equivalently assigned to any appropriate processing circuit in the system as dictated by standard design considerations.

The discussion which follows deals with the situation where the subscriber modem 300, 301 cannot assume an enhanced network codec 217, 218 will perform signal processing to enable high-speed uplink communication. Such a situation arises, for example, when the subscriber modem 300, 301 is coupled across the subscriber line 137 to the standard codec 117. The remote-echo canceller 335 is employed to enable a high-speed uplink connection when no enhanced codec 217, 218 is available.

Referring again to FIG. 3A, the subscriber modem 300 includes a receive-signal path (downlink direction). The subscriber modem 300 interfaces to the subscriber line 137 via a line interface circuit 305. As shown, the line interface circuit 305 may be implemented using a hybrid transformer coupled to a pair of amplifier circuits. The line interface 305 may be implemented in various alternative and equivalent ways which are well known in the art and substantially similar to the circuit shown. In general terms, the line interface circuit 305 includes a bi-directional two-wire interface, a receive-signal output coupling and a transmit-signal input coupling. The two-wire interface is shown as being coupled to the subscriber line 137. The receive-signal output coupling is shown as the output at the upper-right of the line interface 305. The transmit-signal input coupling is shown as the input at the middle-right of the line interface 305. In general, the line interface circuit 305 is operative to couple an analog signal from the bi-directional two-wire interface to the receive-signal output coupling and an analog signal to the bi-directional two-wire interface from the transmit-signal input coupling.

The line interface circuit 305 couples an input from the subscriber line 137 to an antialiasing and line filter 310. The filter 310 may have a passband in a desired frequency range, for example from 200 Hz to 8000 Hz. The output of the antialiasing filter 310 is coupled to the input of a modem ADC 315. The output of the modem ADC 315 is coupled to one input of a subtractor circuit 320. The output of the subtractor circuit 320 is coupled to a modem signal receiver circuit 330. For example, the modem signal receiver circuit 330 may be implemented as V.90 receiver circuit or a receiver circuit similar to the one disclosed in the Townshend patent. Likewise, the modem receiver circuit 330 may be implemented as a "modem receiver module" which may be implemented as a dedicated circuit or a software routine controllably coupled to a processor such as the DSP core 265 or a host processor. Preferably, the modem signal receiver circuit 330 comprises a pulse decoder circuit to decode a pulse amplitude modulated receive signal. The "receive signal" is the signal received from the subscriber line, preferably after the local echo has been removed from an local-echo canceller 325, 320. As discussed below, the modem signal receiver circuit 330 may also perform preprocessing such as filtering and downsampling in some embodiments before standard modem signal demodulation. The output of the subtractor circuit 320 is also operatively coupled to the input of an adaptive filter 335 in accordance with an aspect of the present invention. The adaptive filter 335 is implemented as a part of the feedback module.

In FIG. 3A, the "receive-signal path" corresponds to the path through the two-wire port to the receive-output coupling of the line interface 305, the filter 310, the modem ADC 315, and the subtractor 320. In general, the "receive-signal path" may be any signal path extending from the two-wire port of the line interface 305 to the input of the modem receiver 330. The input to the adaptive filter 335 may be either the same input as applied to the modem receiver or may be some related signal such as one extracted from a different segment of the receive signal path. This is because, for example, additional preprocessing such as extra filtering and equalization may be optionally inserted between the output of subtractor 320 and the input to the modem receiver 330.

The subscriber modem 300 also includes a transmit-signal path (uplink direction). The modem employs a modem transmitter module 340 which converts a bit stream into a digital representation of a modulated uplink signal. For example, the modem transmitter module 340 may be implemented as a dedicated circuit or as a software routine controllably coupled to the DSP core 265. The modem transmitter module receives a digital bit stream from a data source such as an application program or a facsimile machine and modulates this bit stream to form a digital representation of an analog uplink signal. The modulated uplink signal may involve a high-speed version of an analog physical layer protocol as employed by the V.34 modem protocol which uses trellis coded modulation (TCM) with channel preceding to generate a quadrature amplitude modulated signal. Alternatively, the modulated uplink signal may employ a high-speed (e.g. 56 kbps) pulse amplitude modulation physical layer protocol similar to the one used to encode signals for transmission in the downlink direction in V.90 modems. The modem transmitter 340 preferably applies preequalization, for example as discussed in the Ayanoglu system to ensure the codec 117 will properly sample an input signal which is properly timed and has the a signal constellation which substantially coincides with the quantization levels used by the codec 117. As in the Ayanoglu system, this involves training a preequalizer using a set of training sequences between the modem endpoints involved in the communication channel. The function of the preequalizer is to ensure when the uplink signal reaches the network-interface ADC, the network-interface ADC will sample the uplink signal so that its samples lie substantially on a PCM quantization grid. Noise, timing jitter and distortion will cause the sample values to approximate the PCM quantization points instead of hitting them exactly dead-on in most cases. When training the preequalizer, a dither signal may be added to a probing signal to allow make fine adjustments to be made to center a signal value on a quantizer constellation point. For example if a signal value falls between two constellation points and a known dither component is added, the resulting sampled value may then be used to indicate how to make a fine adjustment. A training indication may be transmitted from the far end modem to the subscriber modem indicating how to make an adjustment to cause the signal at the input to the network-interface ADC to take on values at the sample instants closer to the quantization values of the network-interface ADC.

The digital representation of the modulated uplink signal as output from the modem transmitter 340 is coupled to a first input to an adder 345. For example, the adder 345 may be implemented as an adder module which may be implemented as either a dedicated circuit or one or more software instructions controllably coupled to the DSP core 265 and operatively coupled as illustrated in FIG. 3A. The output of the remote-echo canceller 335 is coupled to a second input of the adder 345. The output of the adder 345 is coupled to the input of a modem DAC 350. The output of the adder 345 is also coupled to the X-input of a local-echo canceller 325, 320. The output of the modem DAC 350 is coupled to the input of a reconstruction and line filter 355. The filter 355 may be designed to have a passband in a desired frequency range, for example from 250 Hz to 3500 Hz. In some systems the sample rate of the modem DAC 350 is higher, for example 16000 Hz and the filter 355 has a wider passband, e.g., 200 Hz–80000 Hz. In such systems the modem transmitter 340 or another software module may apply digital filtering to the uplink modem signal. The output of the filter 355 is coupled to the line interface circuit 305 which in turn is coupled to the subscriber line 137. The line interface circuit 305 serves as a bidirectional coupling to couple both the transmit and the receive-signal paths within the subscriber modem 300 to the subscriber line 137. The remote-echo canceller 335 may be viewed as a feedback circuit which processes and couples signal information from the receive-signal path back onto the transmit-signal path.

In FIG. 3A, the "transmit-signal path" corresponds to the signal path originating at the output of the modem transmitter 340 and extending through the subtractor 345, the modem DAC 350, the filter 355 to the transmit-input coupling of the line interface 305 and out the two-wire port of the line interface 305. In general, the "transmit-signal path" may be any signal path extending from the output of the modem transmitter 340 to the two-wire port of the line interface 305. The output to the adaptive filter 335 may be coupled onto the transmit signal path in various ways, such as via the adder 345.

The subscriber modem 300 is operative to receive a high-speed downlink modem signal such as a pulse amplitude modulated waveform similarly to a V.90 modem. The receive circuit 330 employs timing recovery to synchronize to the sample clock employed by the network DAC 120 employed within the network interface 115. As mentioned previously, different types of modulation may also be used in the uplink direction. In a preferred embodiment, a pulse amplitude modulation protocol similar to the V.90 downlink protocol is used. As in conventional V.90 modems, the local-echo canceller 325, 320 cancels an uplink signal echo received from the: subscriber line 137 via the line interface 305 back into the receive-signal path. According to an aspect of the present invention, the remote-echo canceller 335 is incorporated to cancel an echo signal while traversing the remote-echo path 127. The presence of this echo signal limits uplink system performance. The remote-echo path 127 is "remote" from the subscriber modem 300 because the remote-echo path 127 is located on the network side of the subscriber line 137 (remote side from the modem 300). Without loss of generality and without limitation, it is assumed the subscriber line 137 is no longer than 18 kft (kilo-feet).

As has been pointed out in the Dagdeviren reference, the factor limiting the theoretically attainable 56 kbps uplink data rates (as per the Ayanoglu system for example) is the echo path 127 in the network interface. This path gives rise to a "remote-echo signal" as referenced from the subscriber modem 300. It is the function of the remote-echo canceller 335 to cancel or at least substantially reduce the remote-echo signal from the echo path 127. Some mathematical modeling and analysis are needed to order to teach how to perform the signal processing of the remote-echo canceller 335. The remote-echo canceller 335 is configured as a feedback module which receives a downlink signal from the subscriber line 137, processes the received downlink signal, and transmits a remote-echo cancellation signal back onto the subscriber line 137. The "remote-echo cancellation signal" is also referred to herein as a "feedback signal" and a "prediction signal." In some systems locally generated information such as a dither signal may be added to the feedback signal path. This additional data path can be added by the modem transmitter 340, for example. When extra information is added to the prediction signal in the modem 300, 301 the prediction signal is still derived at least partially from information received on the receive-signal path, but extra cancellation or training information is also added to the prediction signal.

With reference now to FIG. 3B, an alternative embodiment 301 of the modem 300 is illustrated. In this embodiment the adder 345 is replaced by a straight-through connection from the modem transmitter 340 to the modem DAC 350. The output of the remote-echo canceller is now routed to a second DAC 360. The output of the second DAC 360 is coupled to a second reconstruction filter 365. In some systems, the second reconstruction filter 365 may be omitted or replaced by a pass-through circuit with a scalar-gain transfer function, i.e., an amplifier circuit. When the filter 365 is omitted, it is replaced by a pass-through circuit with a unity gain. The pass-through circuit may be implemented as a wire, for example. The output of the second reconstruction filter 365 is electronically combined with the output of the reconstruction filter 355 to produce a composite output signal. The composite output signal includes components of the transmit signal and the remote-echo cancellation signal. For example, an analog adder or an analog subtractor circuit using analog amplifier circuits as are known in the art may be used to combine the outputs from the filters 355 and 365. As discussed in connection with FIG. 4, the alternative embodiment 301 allows one to optimize the filter 355 for modem signal transmission while optimizing the filter 365 for remote echo cancellation. This is similar in concept to the version of the modem 300 whereby a single analog filter is used and additional digital filtering is applied to the modem transmit signal prior to conversion to analog. These embodiments enable the subscriber modem to apply a low delay filter to the remote-echo cancellation signal and to apply a standard line filter to the uplink modem signal.

Figure 4:
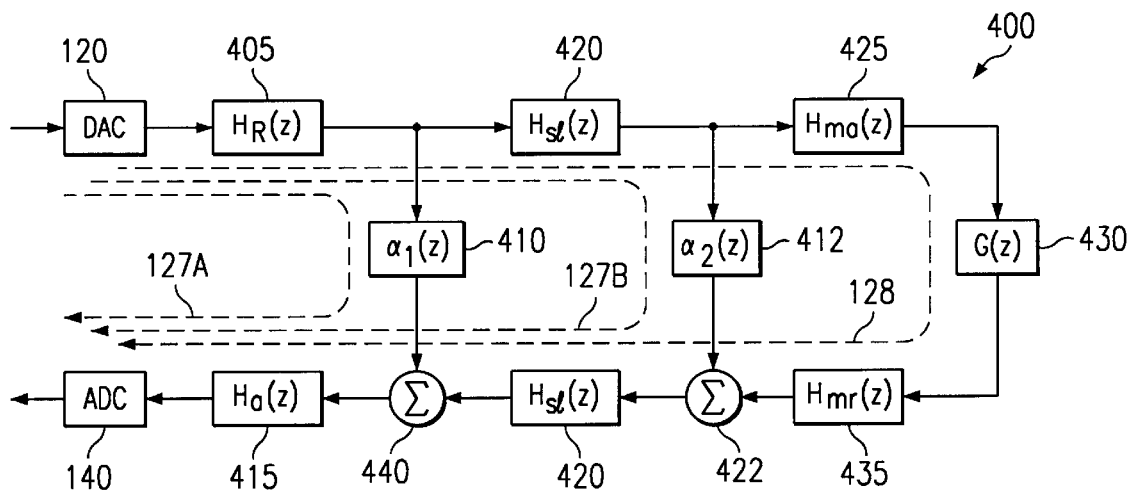
FIG. 4 is a block diagram of a mathematical model illustrating an echo cancellation problem solved by the present invention.

With reference now to FIG. 4, a z-transform domain discrete-time signal processing system description 400 is illustrated to model the signal transfer characteristics of the subscriber modem 300, 301 as connected via the line interface circuit 305, the subscriber line 137, and the line interface 130 to the codec 117 located on the line card 115. The DAC 120 in the network interface card 115 supplies an analog signal to the reconstruction filter 125 whose transfer function is specified in the z-transform domain as $H_r(z)$ 405. The output of the reconstruction filter 125 is coupled to the line interface circuit 130 which gives rise to an associated echo path 127A. The line interface circuit 130 has an echo transfer function $\alpha_1(z)$ 410. The mathematical characteristics of the transfer function $\alpha_1(z)$ 410 are understood in the art and are described, for example in Chapters 6 and 9 of "DSL Simulation techniques and standards, development for digital subscriber line systems" by Walter Chen, MacMillan Publishers. This reference will be referred to as the "Chen reference" hereinafter. The line interface 130's echo path $\alpha_1(z)$ 410 feeds back to the antialiasing filter 135 whose transfer function is modeled as $H_a(z)$ 415. The echo path referenced from the DAC 120's output and feeding back into the input of the ADC 140 directly across the line interface 130 is designated as the echo path 127A. The echo path 127A thus has an associated transfer function given by $H_r(z)\alpha_1(z)H_a(z)$.

The output of the reconstruction filter 125 is also coupled to the subscriber line 137. As discussed in chapter 3 of the Chen reference, the subscriber line 137 has a one-way transfer function which may be modeled in the z-domain as $H_{s1}(z)$ 420. This same transfer function is used to model both the paths from the network interface 115 to the subscriber modem 300, 301 and from the subscriber modem 300, 301 back to the network interface 115. Note in this analysis the subscriber modem 300, 301 replaces the subscriber modem 145 in FIG. 1. The subscriber modem 300, 301 also has a line interface circuit 305 with its own echo path $\alpha_2(z)$ 412. This gives rise to a second echo path 127B referenced from the DAC 120's output and feeding back into the input of ADC 140. The echo path 127B is longer than the echo path 127A in that it traverses the subscriber line 137. The echo path 127B thus has an associated transfer function given by $H_r(z)H_{s1}(z)\alpha_2(z)H_{s1}(Z) H_a(z)$.

The modem-antialiasing filter 310 is modeled as having a transfer function of $H_{ma}(z)$ 425. The remote-echo canceller 335 is modeled as having a transfer function of $G(z)$ 430. The modem-reconstruction filter (355 in FIG. 3A or 365 in FIG. 3B) is modeled as having a transfer function of $H_{mr}(z)$ 435. With all of these transfer functions, and assuming the modem's echo canceller 325 is able to perfectly cancel echo from the modem (300, 301)'s transmit data path from the input to the remote-echo canceller 335, a mathematical model for the echo from the network interface's DAC 120 back to the network interface's ADC 140 is illustrated by the z-domain model 400. The feedback arrangement involving $G(z)$ 430 gives rise to a remote-echo cancellation path 128 referenced from the DAC 120's output and feeding back into the input of ADC 140. The transfer function of the remote-echo cancellation signal feedback path 128 has an associated transfer function $H_r(z)H_{s1}(z)H_{ma}(z)G(z)H_{mr}(z)H_{s1}(z)H_a(z)$.

In an aspect of the present invention it is contemplated that the remote-echo canceller 430 is configured to cancel or at least substantially reduce echo components observed at the input to the ADC 140. Based on physical system considerations, all of the transfer functions in the model 400 are fixed except $H_{mr}(z)$ 425, $H_{ma}(z)$ 435, and $G(z)$ 430. As will be discussed, the transfer functions $H_{mr}(Z)$ 425 and $H_{ma}(z)$ 435 are typically chosen to provide the appropriate low-pass frequency response, have a low delay characteristic, and be invertable. As previously discussed the filter architectures 310 and 355/365 are preferably constructed to provide a lesser degree of filtering in the echo cancellation path 128 than is applied to the modem signals themselves. An object of the present invention is to select $G(z)$ 430 so as to minimize echo components as measured at the input to the ADC 140. It is recognized the echo may be equivalently cancelled at a summing point 440 prior to the transfer function $H_a(z)$. Aspects of the present invention solving the foregoing remote-echo cancellation problem are discussed in connection with FIG. 5 to FIG. 7.

Figure 5:
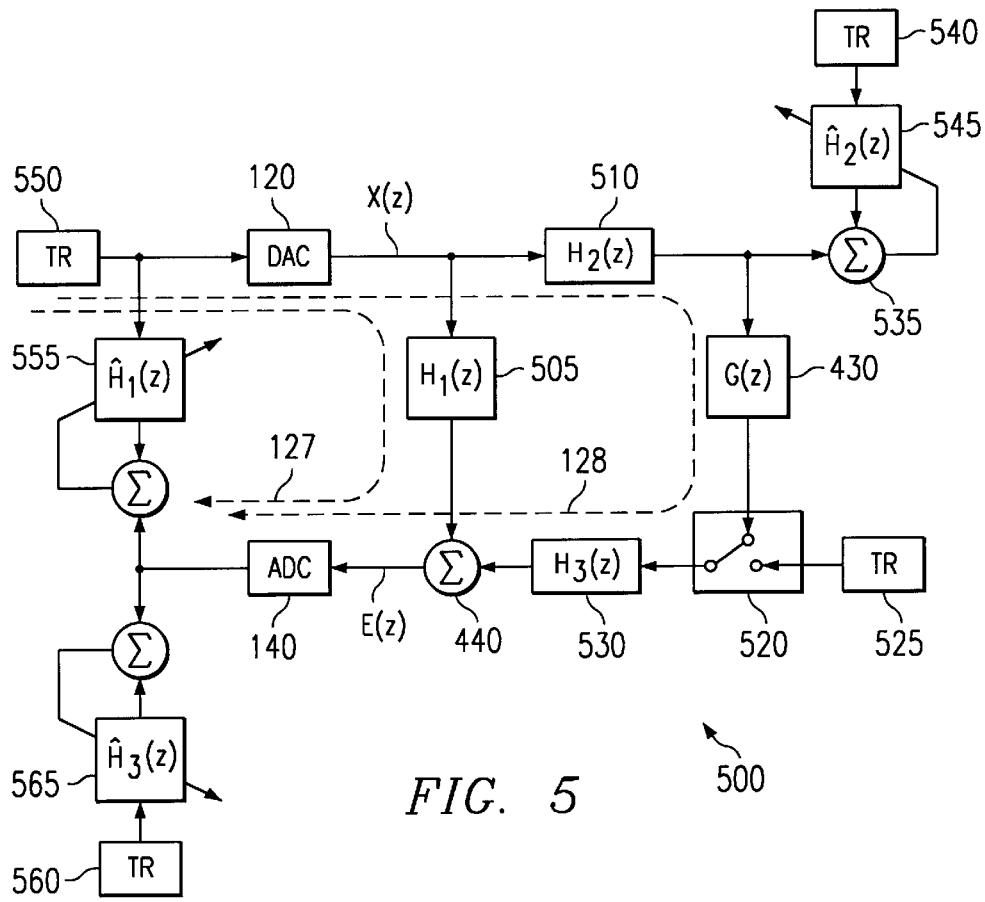
FIG. 5 is a block diagram of a mathematical model illustrating digital signal processing techniques used to solve an echo cancellation problem the present invention.

With reference now to FIG. 5, a simplified mathematical model 500 is illustrated. Also illustrated in FIG. 5 is a set of adaptive filters which may be used to identify sets of one or more adaptive parameters to model the individual transfer functions in the mathematical model 500. The mathematical model 500 models the same system as the mathematical model 400 but groups transfer functions together in order to simplify analysis and understanding of the system. The model 500 also illustrates concepts related to methods to identify system parameters using training signals and adaptive filtering. Parameters which are adjusted adaptively in response to a training signal, a probing signal or another type of signal such as modem signal are called "adaptive parameters." Adaptive parameters may also be derived from other adaptive parameters which are adjusted adaptively. The identified system parameters may be used in turn to estimate an optimum set of one or more coefficients for the remote-echo canceller $G(z)$ 430. These one or more coefficients are adaptive parameters.

The output of the DAC 120 is coupled to an echo-return transfer function $H_1(z)$ 505 which corresponds to the sum of the transfer function associated with the echo paths 127A and 127B. This echo-return transfer function $H_1(z)$ corresponds to the net echo path 127. The output of the DAC 120 is coupled via the LPF 125, 405, the line interface circuit 130, the subscriber line 137, the LPF 310 and the modem ADC 315 to the input of the remote-echo canceller $G(z)$ 430. This path is modeled as a transfer function $H_2(z)$ 510. The transfer function from the remote-echo canceller's output through the modem's reconstruction filter (355 or 365), the subscriber line 137, the network hybrid circuit 130, and the antialiasing filter 135, 415 is modeled as the transfer function $H_3(z)$ 530.

Using the model 500, a design equation may be written to identify an optimum solution. Note the echo canceller residual echo output error signal is given by $E(z)=[H_1(z)+H_2(z)G(z)H_3(z)]X(z)$, where $X(z)$ is the z-domain output from the DAC 120 and $E(z)$ is the echo signal referenced at the input to the ADC 140. When the echo is perfectly cancelled, $E(z)=0$ for all $z$. This occurs when $H_1(z)=-H_2(z)G(z)H_3(z)$. So the optimum value of $G(z)$ 430 is $$G(z) = -\left(\frac{H_1(z)}{H_2(z)H_3(z)}\right)$$

Unfortunately, it may be impossible in many cases for a solution of this form to exist which is both causal and/or stable. When the net delay (group delay) through $H_1(z)$ is less than the net delay through $H_2(z)H_3(z)$ it becomes impossible to find a realizable $G(z)$ to compensate this difference in delay. Also, if either of the transfer functions $H_2(z)$ or $H_3(z)$ or have non-minimum phase zeros (zeros outside the unit circle), no stable solution for $G(z)$ 430 will exist. In such situations, an estimate for the optimum value of G(z) 430 is used. Hence in many cases, the echo E(z) may not be completely cancelled but only substantially reduced. The amount of achievable remote-echo cancellation is limited by these factors. However, the echo need only be cancelled over a finite and relatively small frequency range from 200 Hz to approximately 4000 Hz. Also, delays need to be considered in terms of the sample rate which is 8000 Hz at the input to the ADC 140.

The delays in the model 500 may be analyzed using telephone system transmission and hybrid echo models as are known in various publications such as the Chen reference. Based on FIG. 4, the echo path 127 includes two components, 127A and 127B. Echo signals traveling on these paths are cancelled using a signal at least partially traversing the remote-echo cancellation path 128. The main delay issue arises when attempting to cancel an echo from the echo path 127A using the remote-echo cancellation path 128. Without loss of generality and without limitation, an example set of worst-case delay numbers will be presented. Based on Chapter 3 of Chen reference as well as various Bell systems publications known in the art, the propagation delay through each of $H_2(z)$ and $H_3(Z)$ is on the order of 0.04 ms for a long subscriber line whose length is the maximum distance of 18 kft. Thus the round-trip delay through $H_{s1}(z)$ $H_{s1}(z)$ is 0.08 ms. As referenced at the input to the ADC 140 whose sampling frequency is 8000 Hz, samples are spaced by 0.125 ms. Hence even on some poor subscriber lines, the round trip delay amounts to less than one sample as measured at the input to the ADC 140. The other transfer function components within the net round-trip transfer function in the remote-echo cancellation path 128 are the modem's antialiasing and reconstruction filters. In accordance with an aspect of the present invention, these filters are preferably designed to provide as small of a delay as possible. In the modem 300, 301, the sample rate is preferably 16000 Hz or more. As illustrated in FIG. 3B, a separate low-delay reconstruction filter may be used to provide a low-delay remote-echo cancellation path between the remote echo-canceller's output and the subscriber line. Likewise, a multistage or parallel antialiasing filter architecture may be used in the analog modem so that the antialiasing filter 310 provides a minimum delay in the remote-echo-cancellation path 128 while additional antialiasing filtering is applied to the modem's receive signal within the receiver 330. For example, the sample rate of the modem ADC 315 may be made to be 32000 Hz and a second filter and downsampler may be employed as a preprocessor in the receiver 330. Various known filter design methods may be used to design filters in the modem whose transfer functions 425 and 435 have minimal delays. Hence with a proper low-delay filter design, the delay between the path 127A and the path 128 can be made to be on the order of one sample at 8000 Hz and two samples at 16000 Hz. In accordance with another aspect of the present invention, these filters should preferably designed to be invertable to within a delay (for example within the frequency range from 200 Hz to 4000 Hz) by the remote-echo canceller G(z) 430. Note the band limited nature of the echo paths and the oversampling in the modem 300, 301 provides a predictable (and thus cancelable) component in the echo signal path 127 so the remote-echo canceller 430 can effectively deal with many delay situations as will be encountered in practice.

An estimate of the optimum set of cancellation parameters should be obtained to enable the remote-echo canceller 430 to minimize the residual echo as measured at the input to the network ADC 140. Several methods may be used to obtain this estimate. These methods include adaptive filtering, matrix methods, and other methods such as neural network and fuzzy systems processing. At this point in time the preferred methods are adaptive filtering and matrix methods as will be discussed herein. Other methods to derive an optimum set of parameters for the transfer function G(z) 430 are also within the scope of the present invention. In fact, other types of processing to include nonlinear path modeling may be employed without departing from the scope of the present invention.

The echo-path model $H_1(z)$ 505 can be identified by sending a training signal from a training signal generator 550 which is located in the far-end modem (e.g. the digital modem 105). For example, an adaptive echo canceller 555 in the digital modem 105 is adapted so that it converges to an estimate of the transfer function H. (z) 505. Such echo cancellers are described in the Chapter 9 of the Chen reference. An additional propagation delay may also be identified in the digital modem 105. This additional delay accounts the transmission delay through the digital network 110. Barring any intermediate four-wire/two-wire/four-wire conversions in the digital network 110, the detected delay will be a pure propagation delay and thus may be digitally removed to obtain a non-delayed estimate of $H_1(z)$ 505. At the same time as the digital modem 105 trains its echo canceller to identify $H_1(z)$ 505, the subscriber modem may identify $H_2(z)$ 510. This is performed using an adaptive filter 545 which is excited by a synchronized version of the same training signal as sent from the digital modem 105. When the adaptive filter 545 converges, it converges to an estimate of $H_2(z)$ 510. It is not required that the adaptive filters 545 and 555 are trained simultaneously, but this represents a preferred embodiment at this time. Another training signal may be generated in the subscriber modem 300, 301 using a training signal generator 525 (preferably implemented in software). The digital modem 105 then synchronizes to this training signal and regenerates a copy of it using a training signal generator 560 (also preferably implemented in software). The regenerated training signal is coupled into the input of an adaptive filter 565 which converges to an estimate of a delayed version $H_3(z)$ as it attempts to minimize the difference between its output and the training signal sent from the signal generator 525 and received via the digital network 110. The adaptive filter 565 will converge to an estimate which includes a digital network propagation delay, but again, this pure delay may be removed so as to obtain an estimate of $H_3(z)$. With all of these transfer functions estimated, the cancellation filter 430 may be obtained as the closest causal and stable estimate of $$G(z) = -\left(\frac{\hat{H}_1(z)}{\hat{H}_2(z)\hat{H}_3(z)}\right).$$

As is known in the art of mathematical estimation, the measure of closeness may be with respect to any selected system of measure such as an $l_2$-norm, a weighted norm, or an $l_\infty$-norm. Also, this estimate may be constrained to a class of solutions such as a moving average model (MA), an auto-regressive model (AR), or an auto-regressive moving average model (ARMA). In terms of digital filters, this solution may be in the form of a finite impulse response (FIR) filter or an infinite impulse response (IIR) filter. When FIR adaptive filters are used and G(z) 430 is restricted to be FIR, the above estimation equation may be solved as a matrix least squares problem. This is performed by forming a (Toeplitz or Hankel) convolution matrix whose coefficients represent the FIR coefficient estimates of $\hat{H}_2(z)\hat{H}_3(z)$ to obtain the convolution matrix, H, forming a coefficient vector h with the FIR coefficient estimates of $\hat{H}_1(z)$, and then solving the least squares problem Hg=−h. The solution vector g will thus be an estimate of the coefficients of an FIR estimate of the optimum value of G(z) 430.

Other methods can be devised to obtain the optimum value of G(z) 430. One aspect of the present invention involves a training procedure derived herein which allows the far-end modem (such as the digital modem 105) to generate all of the needed training signals. All the subscriber modem 300, 301 needs to do is insert a set of known parameters for the remote-echo canceller G(z) 430 during a specified training phase. In this procedure, the far end modem sends a first training signal and adapts its echo canceller 555. Next the far-end modem sends a second training signal (possibly equal to the first training signal) and readapts its echo canceller while the subscriber modem inserts a known set of parameters for the filter G(z) 430. Next either the far modem end (e.g., 105) or the subscriber modem 300, 301 computes an estimate for the optimum parameters of G(z) 430. The mathematical algorithm behind this training system and method which are both illustrated in FIG. 5 is developed next.

In FIG. 5, the far end modem takes part in a first training phase whereby it transmits a training signal using the training signal generator 550 and adapts the adaptive model 555 to converge to an estimate of the echo path 127. Meanwhile, the subscriber modem 300, 301 disables its remote-echo canceller's adaptive filter 335 to set the signal on the signal path 128 to zero. Let $W_0(z) \rightarrow \hat{H}_1(z)$ represent the adaptive filter parameter vector 555 which converges to an estimate of the signal path $H_1(z)$ 505 during this first phase of adaptation. In a second phase of adaptation a second training signal (possibly equal to the first training signal) is sent from the training signal generator 550. The subscriber modem sets its remote echo canceller's parameters to a known set of values, thereby forcing $G(z)=G_0(z)$. Let $W_1(z) \rightarrow [\hat{H}_1(z)+\hat{H}_1(z)\hat{G}_0(z)]$ represent the adaptive filter parameter vector 555 which converges to an estimate of the transfer function of the signal path 127 plus the signal path 128 during this second phase of adaptation. Here $\hat{H}_1(z)$ is an estimate for the round-trip subscriber line transfer function, $H_2(z)H_3(z)$. Next note: $[W_1(z)-W_0(z)]=\hat{H}_1(z)\hat{G}_0(z)$. Since $(\hat{G}_0(z)=G_0(z)$ is fixed and known, one can solve for the only unknown in this equation, $H_1(z)$.

When FIR adaptive filters are used and G(z) 430 is restricted to be FIR, the above estimation equation may be solved as a matrix least squares problem. This is performed by forming a (Toeplitz or Hankel) convolution matrix whose coefficients represent the known FIR coefficients $G_0(z)$ to obtain the convolution matrix, H, forming a coefficient vector h with the FIR coefficient vector, $[W_1(z)-W_0(z)]$, and then solving the least squares problem Hg=−h. The solution vector g will thus be an estimate, $\hat{H}_1(z)$, of the coefficients of an FIR estimate of round-trip subscriber line transfer function, $H_1(z)$.

The next observation made in this aspect of the present invention is the complete echo transfer function when the remote-echo canceller 335, 430 is enabled and set to its optimum value is given by: $H_{echo}(z)=H_1(z)+H_1(z)G_{opt}(z)$. An objective of the present invention is thus to minimize the norm of the transfer function $H_{echo}(z)$. Recall $W_0(z) \rightarrow \hat{H}_1(z)$ provides an estimate of $H_1(z)$, and the previous matrix solution has provided an estimate of $H_1(z)$ given by $\hat{H}_1(z)$. To find the optimum value, $G_{opt}(z)$, one thus minimizes over G(z), the scalar function $\|W_1(z)+\hat{H}_1(z)G(z)\|$ for a selected vector norm. When FIR models and the $l_2$-norm are used, this minimization may also be solved as a matrix least squares problem. Specifically, this is performed by forming a (Toeplitz or Hankel) convolution matrix whose coefficients represent the FIR coefficient estimates $\hat{H}_1(z)$ to obtain the convolution matrix, H, forming a coefficient vector h with the FIR coefficient vector, $W_1(z)$, and then solving the least squares problem Hg=−h. The solution vector g will thus be an estimate, $\hat{G}_{opt}(z)$ for subsequent use in the remote-echo canceller 335, 430.

Referring back to FIG. 3A and FIG. 3B, the modem structures 300 and 301 may be used to perform the foregoing remote-echo cancellation. Recall the physical implementation of the modems 300 and 301 are preferably implemented in the same DSP system architecture as illustrated in FIG. 2B. In preferred embodiments, the modem structures 300 and 301 include a first sample clock operating at a first sample rate and a second sample clock operating at a second sample rate greater than the first sample rate. For example, when the network codec 117 samples at 8000 Hz the first sample clock is preferably locked to the network codec 117's sample clock using a clock recovery circuit such as described in the Townshend patent. This clock recovery circuit is preferably implemented as a part of the modem receive circuit 330. The second sample clock is then preferably operated at 16000 Hz or above. The signal processing of the feedback path of the remote-echo canceller 335 is then performed at a rate determined by the second sample clock. For example, a DSP may have an interrupt coupled to the 16000 Hz sample clock and process one sample through the feedback path 335 each clock interval of the second sample clock.

The feedback module then feeds a signal derived at least partially from the receive signal back onto the subscriber line 137. The feedback module estimates a prediction signal such that when the prediction signal is sent through the subscriber line 137, it will predict and attenuate an echo component as measured at the network-side of the subscriber line 137. While the 8000 Hz data signal is largely unpredictable, when sampled at a higher rate such as 16000 Hz or above it becomes predictable due to its band-limited frequency domain profile as imparted by the LPF's 125 and 310. Hence the feedback signal preferably compensates for at least a portion of the delay between the echo path 127 and the echo cancellation path 128 and also reduces the echo as measured at the ADC 140's input. The prediction signal may be mathematically derived or adapted to cancel the echo as measured either before or after the LPF 135. By remotely canceling an echo component as seen at the input to the ADC 140, the subscriber modems 300 and 301 enable an increased data rate in the uplink direction. Once the remote-echo is removed, enhanced data rates may be achieved by pre-equalizing a transmit pulse signal so that when the pre-equalized signal reaches the ADC 140, its values are substantially equal to the network ADC 140's quantization levels at the sample instants (for example using preequalizer training or the preequalization as taught in the Ayanoglu system).

When the feedback module implementing the remote-echo canceller 335 generates the prediction signal (i.e., the feedback signal), the prediction signal is coupled onto the transmit signal path and the subscriber line 137 and is eventually sampled by the network-interface ADC 140. The remote-echo signal traveling along the path 127 linearly combines with the prediction signal traveling at least partially along the path 128 when they meet at the analog summing junction 440. The summing junction 440 models a linear combination process which occurs in the line interface 130. The effective summing junction 440 within the line interface 130 substantially produces at its output the sum of the remote-echo signal and the prediction signal which predicts the additive inverse of the remote-echo signal as seen at the input to the network-interface ADC 140 or just prior to the filter 135. The output of the effective summing junction 440 in response to the signal components traveling along the signal paths 127 and 128 is called the composite-remote-echo-error signal and is modeled as E(z). A selected measure such as an energy function, a weighted norm or the like may be applied to both the remote-echo signal and the composite-remote-echo-error signal. The prediction in the feedback module is computed so that when this measure is applied to each of these signals, the measure applied to the composite-remote-echo-error signal is less than the measure applied to the remote-echo signal. When this occurs, at least a component of the remote-echo signal is said to have been "cancelled."

Figure 6:
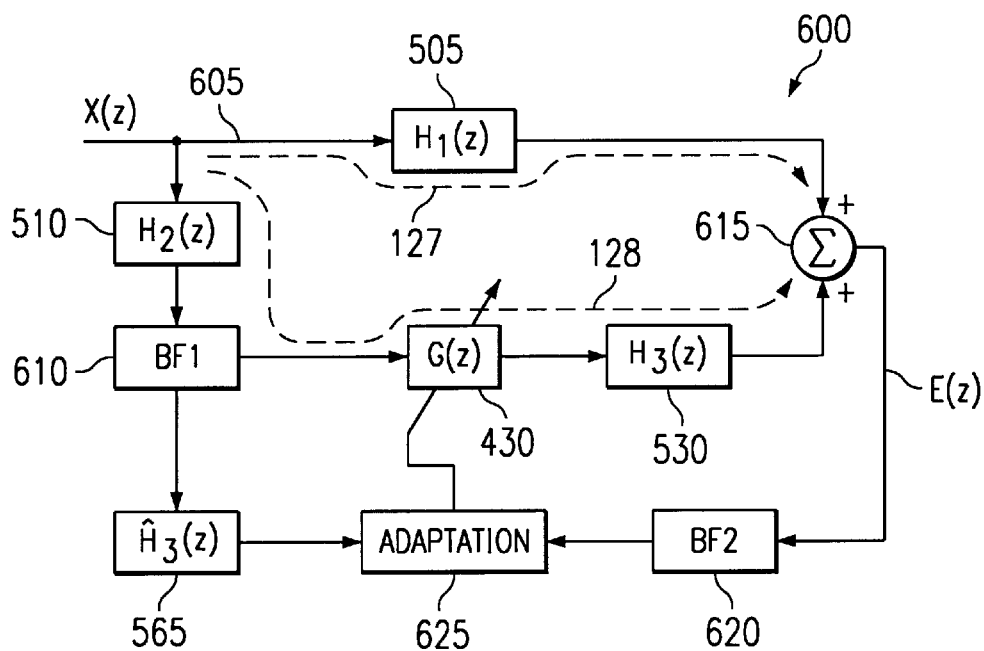
FIG. 6 is a block diagram of a FXLMS adaptive signal processing system configuration which may be used to estimate the coefficients of a remote-echo canceller using on-line block estimation.
Figure 7:
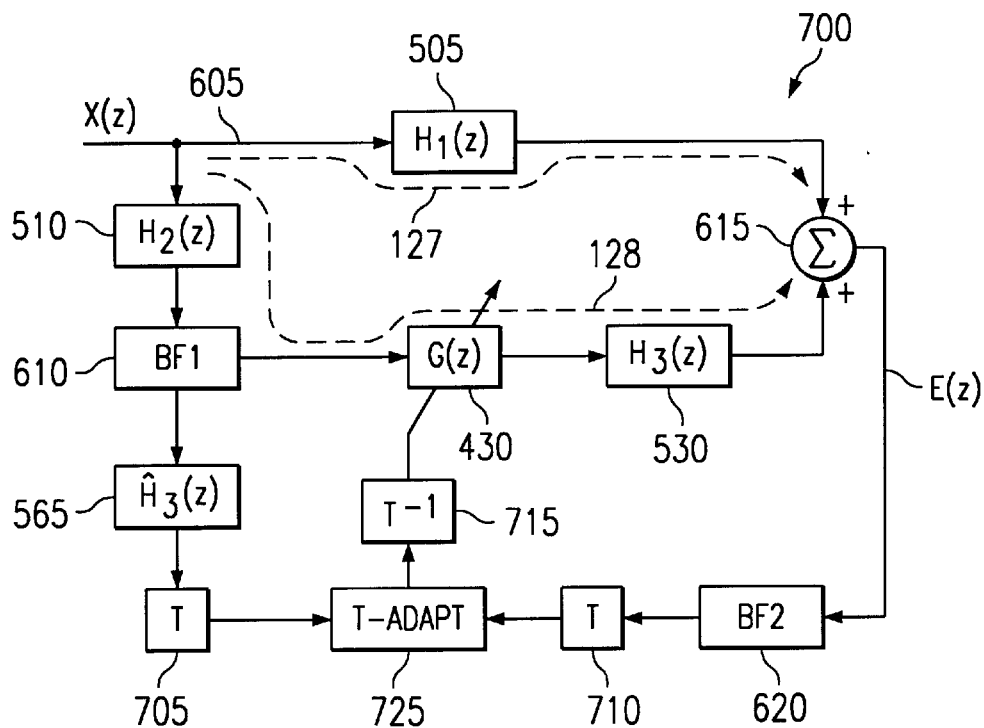
FIG. 7 is a block diagram of a FXLMS adaptive signal processing system configuration which illustrates a transform domain approach to estimate the coefficients of a remote-echo canceller using on-line block estimation.

With reference now to FIG. 6, a block diagram of an on-line adaptive estimation system is illustrated. One observation contemplated by the present invention is that the mathematical models as presented in FIG. 4 and FIG. 5 are similar to the mathematical models used to represent active noise cancellation problems as arise in acoustic ducts. Fortunately, the system delays and related transfer characteristics are more controllable in the problem of remote-echo cancellation as developed herein. For a treatment of active noise cancellation systems and the adaptive signal processing structures employed thereby, refer to the Kuo reference. This reference describes several active noise control systems based upon variations of the filtered-X LMS (FXLMS) adaptation algorithm which is known in the art. Any of the variations of the FXLMS cancellation systems as discussed therein may be adapted to solve the foregoing remote-echo cancellation problem. For example, the system of FIG. 3.5 of the Kuo reference is adapted to the instant application of remote-echo cancellation hereinbelow. Additional modifications may be made, for example as shown in FIG. 7.10 of the Kuo reference. FXRLS, FULMS and lattice-based systems may also be equivalently developed. Hence, given the teachings of the present invention, one skilled in the art may adapt known signal processing structures such as those described in the Kuo reference to the remote-echo cancellation problem in order to increase the uplink data rate achievable in the telephone system in the presence of standard network codecs such as the codec 117. Therefore, all such embodiments are within the scope of the present invention.

FIG. 6 illustrates a FXLMS adaptive signal processing system 600 which is mathematically similar to the one shown in FIG. 3.5 of the Kuo reference. In the system 600, a signal X(z) is applied at a reference point 605 which corresponds to the output of the digital modem 105 (or a remote peer modem). The signal X(z) is preferably generated by training signal generator 550 discussed in connection with FIG. 5. The signal X(z) propagates across the echo path 127 as represented by the transfer function $H_1(z)$ 505. Whereas in the Kuo reference, $H_1(z)$ corresponds to P(z), the acoustic transfer path from an acoustic noise source to an error microphone, the transfer function $H_1(z)$ as used herein corresponds to the echo path model 505 (127) as discussed in connection with FIG. 5. The signal X(z) also propagates through the transfer function $H_2(z)$ 510 which models the analog path from output of the network DAC 120 through the subscriber line 137 and the antialiasing filter 310. The output of transfer function $H_2(z)$ 510 is applied to the input to the remote-echo canceller G(z) 430 via an optional block former 610. The output of the remote echo canceller G(z) 430 next passes through the reconstruction filter (355 or 365), the subscriber line 137 and the antialiasing filter 415 as modeled by the transfer function $H_3(z)$ 530. Note $H_3(z)$ is mathematically similar to S(z), the electro-acoustic path between the adaptive noise canceller and the error microphone in the Kuo reference. The adder 615 models the analog addition of the signals traversing the paths 127 and 128 as referenced at the input to the ADC 140 (corresponding to the adder 440 in the model 400). The output of the adder 615 provides an error signal E(z). This error is also called the composite-remote-echo-error signal. When the remote-echo is perfectly cancelled, E(z)=0 for all z. The error signal E(z) is transmitted across the digital network 110 and is then received by the far-end modem such as the digital modem 105. After a block-training period, the far-end modem optionally transmits a digitally encoded version of the error signal back to the subscriber modem 300, 301. An optional second block former 620 collects a block of error values for use in adaptive echo canceller training using an adaptation algorithm 625 such as the LMS or RLS algorithm to adapt the filter tap weights of G(z) 430 so as to reduce a measure of the error signal E(z). Most often the adaptation algorithm will minimize either the mean squared error of E(z) or an exponentially weighted time-average of E(z). Systems may also be developed to minimize alternative measures such as the maximum deviation of E(z). The adaptation algorithm 625 may be implemented using the LMS algorithm, for example. In such a case the X-input to the LMS adaptation algorithm is the same as the input applied to the filter G(z) 430 except it is preprocessed through the filter model $\hat{H}_3(z)$ 565. This approach follows a FXLMS oriented adaptation scheme as is known in the art. The filter $\hat{H}_3(z)$ may be estimated as discussed in connection with FIG. 5 or updated on-line in a manner as described in connection with FIG. 7.10 of the Kuo reference, for example. In any case, the adaptation algorithm 625 is operative to update or otherwise compute a set of filter parameters for the filter G(z) 430 to cause the selected measure of the error signal E(z) to be reduced. The system 600 enables the parameters of the remote-echo canceller G(z) 430 to be adjusted to approach an optimum value so as to minimize the selected measure of E(z). Thus it may be seen the while the system 600 may be modeled using a mathematical model similar to those used to model acoustic ducts, the system 600 involves a substantially different structure and configuration than that of an acoustic duct. For example, the system 600 involves a distributed signal processing configuration whereby different modem endpoints cooperate across the digital network 110 to compute a predictor to cancel an unobservable echo hampering communication therebetween. Also, the input to the adaptive system traverses an additional signal path $H_2(z)$ 510 prior being input to the blocks 430 and 565.

The aforementioned difference in structure dictates that the FXLMS oriented adaptive remote-echo-cancellation system 600 is preferably adapted using a block-oriented approach. A block method is desirable because of the delay associated with the propagation of the error signal E(z) back and forth from the network interface 115 to the far-end modem (e.g., the digital modem 105) and optionally back to the subscriber modem 300, 301 which then adjusts G(z) 430 accordingly. In an alternative embodiment the far-end modem implements the adaptation algorithm 625 and transmits the adaptive filter parameters back to the subscriber modem. Block adaptive filtering algorithms are known in the art and include transform domain algorithms, conjugate gradient algorithms, and block Shanno algorithms for example. Although an aspect of the present invention employs block processing for adaptive filter training, subsequent signal processing (i.e., filtering within the data path 128) is preferably performed using standard sequential (sample-by-sample) time-domain processing. This is because block methods introduce delays into the signal path and delays cannot be tolerated in the signal path 128 of remote-echo cancellation as disclosed herein. Hence the preferred approach is to use a block adaptation algorithm to compute a set of filter parameters for G(z) 430, and then filter with G(z) 430 on a sample-by-sample (sequential) basis. To describe selected preferred embodiments, specific examples of adaptive remote-echo cancellers which use block processing are discussed in more detail hereinbelow.

It is to be understood the system 600 is itself distributed between the far-end modem (e.g., the digital modem 105), the subscriber modem 300, 301, the network codec 117, and the transfer functions therebetween. The adaptive filter 430 resides in the subscriber modem 300, 301 while the signal X(z) is generated in the far-end modem. Likewise, the error signal E(z) generated within the network interface 115 where it is sampled and transmitted across the digital network 110 to the far-end modem. The adaptation of the filter G(z) 430 is may be equivalently accomplished in either the far-end modem (e.g. the digital modem 105) or the subscriber modem 300, 301 in software using a digital signal processor which runs a block FXLMS or related adaptation algorithm. This adaptation algorithm 625 is configured using the inputs and outputs as illustrated in the system 600. The system 600 therefore comprises, individually and together, the signal processing devices needed within both the far end modem and the subscriber modem 300, 301. These two modem endpoints cooperate to implement the signal processing functions of the adaptive remote-echo cancellation system 600.

The system 600 gives rise to a signal processing apparatus structure for use in the subscriber modem 300, 301. The subscriber modem follows the general architecture as the modem 300, 301 and preferably uses the DSP architecture as illustrated in FIG. 2B. The apparatus includes a coupling to the subscriber line 137 a via a subscriber-side coupling such as the line interface circuit 305 or its equivalent. The coupling 305 includes a receive-signal path on which a receive signal is received from the subscriber line 137 and a transmit-signal path on which a transmit signal is transmitted onto the subscriber line 137. As per FIG. 1, the subscriber line 137 is also coupled to the network interface 115 or its equivalent. The network interface 115 includes the network codec 117 with the ADC 140. The subscriber modem apparatus 300, 301 also includes the modem receiver circuit 330 which is coupled to the receive-signal path and operative to demodulate the receive signal to produce a digital bit stream. The apparatus also includes the first block former 610 for storing a sample of a training signal received from said subscriber line. In sequential processing embodiments, this block former may be equivalently embodied as the first tap of an adaptive filter to be described below. In the preferred embodiment, the first block former 610 stores a plurality of samples and is implemented as a storage array in the data memory 268. The apparatus also includes a parameter of a subscriber line transmit path model $\hat{H}_3(z)$ 565. In preferred embodiments, a plurality of parameters is used to model the subscriber line transmit-signal path $H_3(z)$ 530. The subscriber modem apparatus also includes the second block former 620 for storing an error signal sample. In a preferred embodiment, a plurality of error samples are stored in the second block former 620, and the second block former 620 is also implemented as a storage array within the data memory 268. The one or more error signal samples are received from the subscriber line 137 and are demodulated by the modem receiver circuit 330. Note this is different from the training signal X(z) which is sampled but not demodulated prior to being processed by the adaptation algorithm 625 and the filter model 565.

The subscriber modem apparatus also includes the adaptive filter 430 which is coupled to receive an input from the first block former and is also coupled to deliver its output samples to the transmit-signal path. The adaptive filter 430 includes a tap weight vector made up of at least one tap value. The adaptive filter 430 may in general be FIR, IIR, or some other type of adaptive signal processing structure such as a multi-layered neural network model. The apparatus also preferably includes the adaptation algorithm 625 which is coupled to receive the contents of the first block former 610 after these contents have been processed through the transmit path model $\hat{H}_3(z)$ 565 using the at least one parameter. In some equivalent and substantially similar embodiments, a third block former can be interposed between the output of the filter model 565 and the input to the adaptation algorithm 625. The adaptation algorithm 625 is also coupled to receive the contents of the second block former 620. The adaptation algorithm 625 is preferably implemented as a software module located in the PMEM 266 and is controllably coupled to the DSP core 265. The adaptation algorithm 625 may optionally be implemented in any selected digital processing technology such as a full custom hardwired logic circuit, a VHDL functional description processed to configure a gate array circuit, or in a host signal processing arrangement. The adaptation algorithm 625 is operative to update the parameters of the adaptive filter 430. This update is preferably made to reduce a measure of the error signal E(z). This adaptive filter update may be performed using, for example the FXLMS, FXRLS, block conjugate gradient, or similar algorithms as previously described. An adaptation-block size greater than one sample is used with the selected adaptation algorithm in the preferred embodiment.

The subscriber modem apparatus receives one or more of the training signals their associated composite-remote-echo-error signals and updates the tap weight vector 430 so as to cause the selected measure of the error signal to be reduced. The apparatus subsequently processes samples from the receive-signal path through the adaptive filter 430 (335) and couples the output of the adaptive filter to the transmit-signal path so as to attenuate an echo component as measured at the input to the ADC 140.

In an alternative embodiment the adaptation is carried out in the far-end modem as opposed to the subscriber modem. The cooperating far-end modem then transmits to the subscriber modem the adaptive parameters of the remote-echo canceller 335, 430 as opposed to sending the error signal. In this type of alternative embodiment the subscriber modem need not include the blocks 610, 565, 625, and 620. All that is needed is for the subscriber modem to receive the parameters, decode them, and insert them into the feedback module which in turn implements the remote-echo canceller 335, 430.

The system 600 also gives rise to a cooperating modem apparatus structure implemented at the far end of the digital network 110. This modem structure takes on the same type of physical processor architecture structure as described in connection with the modem 300, 301 and the enhanced codec 217 in FIG. 2B. The cooperating modem apparatus may be implemented as the digital modem 105 or as a peer-analog modem. This cooperating modem apparatus is coupled to the digital network 110 via either an analog connection as per the network line interface 115 or a digital connection as used to connect the digital modem 105 to the digital network 110. The cooperating modem apparatus is operative to cooperate with the analog subscriber modem 300, 301 located across the digital network 110. In terms of FIG. 1, the analog subscriber modem 300, 301 is located in the same position as the prior art analog modem 145. The cooperating modem apparatus assists the analog subscriber modem 300, 301 in adapting its remote-echo canceller 335, 430 so as attenuate an echo component as measured at the input to the ADC 140 which is located in the network interface 115.

The cooperating modem apparatus includes a training signal generator which generates a training signal. This training signal generator (as per 550) is typically implemented as a software module located in the PMEM 266 and is controllably coupled to the DSP core 265. The cooperating modem apparatus also includes a modem receiver (digital or analog signal receiver like the receiver 340) coupled to the digital network 110 via either an analog or a digital network interface. The modem receiver is operative to receive an error signal which corresponds to an echo-error signal which feeds back from the DAC 120 to the ADC 140 via the signal paths 127 and 128. The cooperating modem apparatus also includes a transmitter coupled to the digital network 110. The transmitter is operative to transmit the training signal and subsequently a digitally encoded representation of the error signal to the digital network 110. These signals are then used by the subscriber modem 300, 301 to adapt its remote-echo canceller 335, 430. This 15 adaptation is preferably performed using the adaptation algorithm 625.

In an alternative embodiment, the cooperating modem also performs the adaptation of the adaptive parameters. In this case the cooperating modem includes the blocks 610, 565, 625 and 620. The cooperating far-end modem thereby sends the adaptive parameters 430 instead of the error signal to the subscriber modem.

With reference now to FIG. 7, a block diagram of a transform-domain block adaptation system 700 is illustrated. This system, in the same ways as the system 600, is distributed across the far-end modem (e.g. the digital modem 105), the subscriber modem 300, 301 and the network interface 115, and the associated transfer functions therebetween. The system 700 therefore also comprises individually and together, the signal processing devices within the far-end modem and the subscriber modem 300, 301 used to carry out the adaptive remote-echo cancellation of the system 700.

When the system 700 has converged to a solution for G(z) 430, the actual filtering is preferably performed sequentially and in the time domain as illustrated in FIG. 3A or FIG. 3B using the remote echo canceller filter G(z) 430. The system 700 includes all the same blocks and connections as the system 600 when block formers are applied. The output of the filter $\hat{H}_3(z)$ 565 as used for the input to the FXLMS adaptation algorithm is sent to a first transform module 705. This transform module may compute any convenient transform such as a fast Fourier transform (FFT) a wavelet transform, a subband decomposition, or the like. In some systems a third block former may be interposed between the filter model 565 and the first transform module 705. The output of the second block former 620 is sent to a second transform module 710. The filter parameters of the filter G(z) 430 are adapted in the transform domain using an algorithm such as a frequency domain or a wavelet domain LMS or transform-domain block conjugate gradient algorithm, for example. Transform domain block adaptation algorithms are well known, see for example section 8.2.2 of the Kuo reference for the full details of the adaptation equations in an FFT based algorithm. In accordance with an aspect the present invention, the signal processing through the filter 430 is performed in the time domain because the remote-echo canceller 335 must operate on a given training signal in real-time without a block delay. That is, while block adaptation is performed in the transform domain, an inverse transformation 715 is applied to the filter parameters and low-delay remote-echo cancellation is applied in real-time and in the time domain. This is also how filtering with the adaptive filter G(z) 430 is performed once the weights are adapted.

Modem signal processing structures similar to those discussed in connection with the system 600 may be used to implement the system 700. The key difference is the addition of transform modules 705, 710, 715 at the inputs and outputs of the adaptation algorithm 725. These blocks are typically implemented in the same modem as the one which includes the adaptation module 725. The error signal E(z) may be equivalently transformed via the transform module 710 in either the analog subscriber modem 300, 25 301 or the cooperating far-end modem when adaptation occurs in the subscriber modem 300, 301. In modem structures employing a programmable signal processing circuit such as the DSP core 265, the transform modules 705, 710 and 715 are typically implemented as calls to the one or more software transformation routines which are stored in the PMEM 266 and are controllably coupled to the DSP core 265. Like the adaptation module 625, the adaptation module 725 may alternatively be implemented in the cooperative far-end modem in which case the adaptive parameters instead of the composite-remote-echo-error signal (or a transformation thereof) is digitally encoded and transmitted back to the subscriber modem.

The foregoing mathematical analysis and development of adaptive systems gives rise to several methods for training as carried out in a subscriber modem in cooperation with a far end modem such as the digital modem 105. These methods for training are used to develop one or more sets of parameters for use in remote-echo cancellation to enable high-speed uplink communication.

Figure 8:
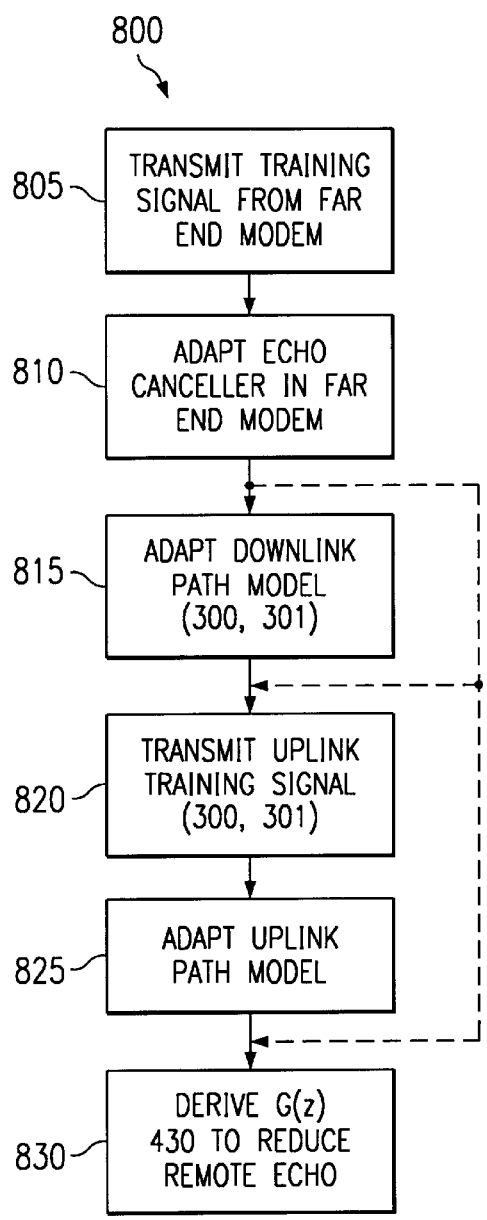
FIG. 8 is a flow chart illustrating methods of processing carried out by an analog subscriber modem and a far-end modem to adapt a set of remote-echo canceller system parameters to enable a high-speed uplink connection.

Referring now to FIG. 8, a method 800 of training is illustrated in block diagram form. This method of training coincides with the mathematical models and remote-echo canceller optimization techniques discussed in connection with FIG. 5. In a first step 805 one or more training signals are transmitted from a far-end modem. This far end modem may be embodied as the digital modem 105 or a peer-subscriber modem. In a second step 810, one or more sets of adaptive echo canceller parameters 555 are adapted within the far end modem based upon the one or more training signals sent in the first step 805. In a preferred embodiment the first and second steps occur simultaneously. In an optional third step 815, a downlink signal path model (e.g. 545) is developed in the subscriber modem 300, 301. For example, this step may also be performed simultaneously with the second step 810 or may involve a successive training signal sent during the first step 805. Note when the training signal sent in the first step 805 reaches the network interface 115, an echo component will return according to the transfer function 505 to the far end modem and a signal component will propagate according to the transfer function 510 to the subscriber modem 300, 301. When the third step 815 is not used, it is bypassed according to one of the bypass paths shown in dotted lines. After the third step 815, control passes to an optional fourth step 820. In the fourth step 820 an uplink training signal is transmitted from the subscriber modem 300, 301 back to the far end modem. This signal may be used to send information used by the far end modem to derive a training-indication signal used to train the preequalizer in the subscriber modem. A dither signal may be added to this uplink-training signal to determine fine adjustments to align the uplink signal with the quantization points of the network-interface ADC. In an optional fifth step 825, the far end modem uses the uplink training signal as sent in the fourth step 820 to adapt an adaptive filter 565 to obtain the uplink path model estimate $\hat{H}_3(z)$. This step may also be used for pre-equalizer training in which case a training-indication signal is sent back to the subscriber modem. Control next passes to a sixth step 830 whereby a set of parameters are computed for the remote echo canceller G(z) 430. Here an estimate for $G_{opt}(z)$ is computed using an appropriate mathematical technique as discussed in connection with FIG. 5.

Note when the steps 815–825 are bypassed, the method 800 preferably involves the process described above whereby the subscriber modem 300, 301 selectively inserts and a known value $G_0(z)$ into the remote-echo cancellation path during training. This allows the far end modem to send a set of successive training signals and to identify the model parameters. For example, the far-end modem transmits a first training signal and the subscriber modem 300, 301 disables its remote-echo canceller. Next the far end modem sends a second training signal while the 300, 301 sets its remote-echo canceller's parameters to a set of known values, $G_0(z)$ and enables the remote-echo canceller 335, 430. When this is done, the aforementioned optimization technique discussed in connection with FIG. 5 may be used to derive $\hat{G}_{opt}(z)$ which corresponds to an estimate of the optimum set of parameters for the remote echo canceller 335, 430. In general, other combinations of training and adaptation phases may be used to identify system parameters to calculate estimates of optimum sets of parameters for the a remote-echo canceller 335, 430. The aforementioned techniques are illustrative of the existence of various embodiments involving cooperative training to identity system parameters and to use these parameters to derive an estimate for the remote-echo canceller 335. 430. All such embodiments are all within the scope of the present invention.

Figure 9:
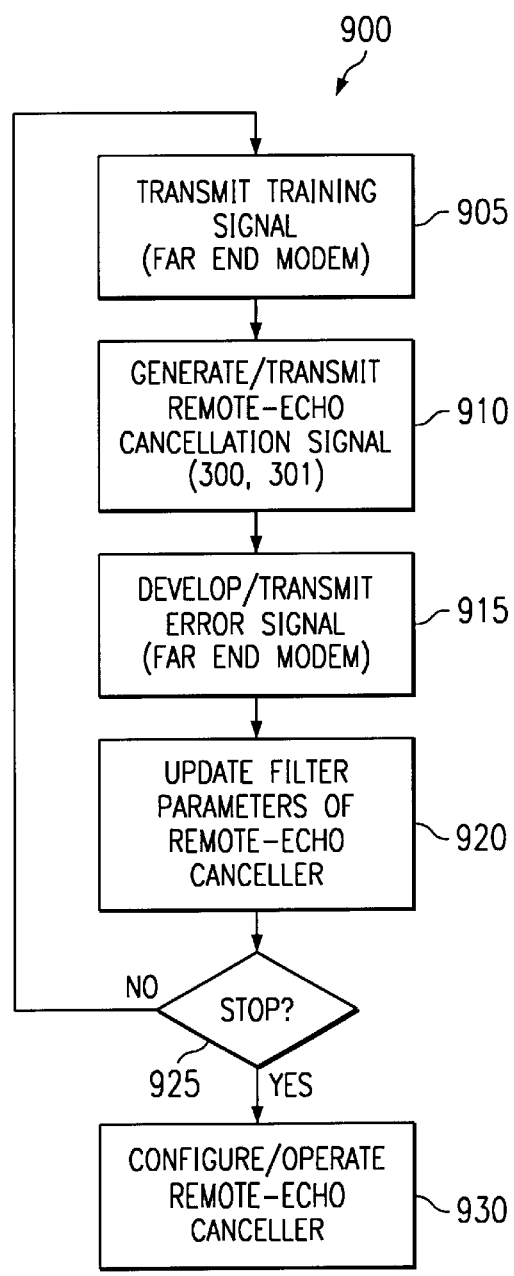
FIG. 9 is a flow chart illustrating a method of processing used to compute a set of remote-echo cancellation parameters using a block-adaptive approach.

Referring now to FIG. 9, a method 900 of training a subscriber modem's remote echo canceller to achieve a higher uplink data rate is illustrated. This method is used, for example in conjunction with the adaptive systems 600 and 700. The method 900 also illustrates a preferred mode of operation for the systems 600 and 700 as well as substantially similar adaptive systems. In a first step 905, a time-domain-training signal X(z) 605 is transmitted from the far end modem. In a second step 910, the subscriber modem 300, 301 or a similar modem is operative to receive the training signal and generate a remote-echo cancellation signal in response to the training signal. This signal is preferably generated using the signal path 430 (block former 610 is bypassed, i.e., is only used for adaptation 625) to create the remote-echo cancellation path 128. The remote-echo signal is also transmitted onto the subscriber line 137 by the subscriber modem 300, 301. This signal propagates along path 128 through the transfer function $\hat{H}_3(z)$ 530 to the ADC 140 where it is digitized after additively combining (615, 440) with the signal traversing the echo path 127 (505) to form the discrete-time error signal E(z), also called the composite-remote-echo-error signal.

In a third step 915, the error signal E(z) is received, stored and transmitted by the far-end modem. This step preferably involves receiving a set of error samples corresponding to the waveform E(z). A block of these samples are preferably stored into the block former 620. If the system 700 is employed, the third step 915 may optionally involve computing a transform of the error signal corresponding to second transform module 710 which follows the second block former 620. In the third step 915 the error signal in then transmitted back to the subscriber modem 300, 301 in a digitally encoded format. For example, if the downlink path has already been trained, the high-speed downlink protocol may be used. Otherwise a low speed protocol such as a DPSK handshake protocol signal may be used to carry the error data back from the far-end modem to the subscriber modem 300, 301.

In a fourth step 920, the adaptation algorithm 625, 725 or some other adaptation algorithm is employed in the subscriber modem 300, 301 to update the filter parameters of the adaptive filter G(z) 430. Recall the adaptive filter G(z) 430 may involve a linear transfer function or a nonlinear transfer function corresponding, for example to a fuzzy system or a layered neural network. As illustrated in the systems 600 and 700 FXLMS, FXRLS, transform variations thereof, and other forms of block adaptive algorithms such as block conjugate gradient algorithms may be used in the fourth step 920. Typically, the step 920 involves an update 625 or 725 whereby an adaptive parameter-correction value is derived and added to the present value of an adaptive parameter to obtain an updated parameter. This follows the general practice of adaptive signal processing. In other embodiments, such as when adaptation is performed the methods discussed in connection with FIG. 5, one set of adaptive parameters may be updated to convergence and the final converged values may be used to derive another set of adaptive parameters corresponding to $\hat{G}_{opt}(z)$.

After the fourth step 920 a decision 925 is made. In the decision 925, a stopping criterion is evaluated. Typically this stopping criterion determines whether the parameters of the adaptive remote echo canceller G(z) have converged to a minimum the with respect to the selected measure of the error. The scalar measure of the error as plotted with respect to the filter parameters G(z) forms the so-called "error surface." For example, at convergence to a local minimum, the gradient of the error surface with respect to the filter parameters may be evaluated and found to be zero. In another example, the change in the selected measure of the error may be monitored for successive training blocks, and it may be determined that no significant improvement has resulted in additional training. If the stopping criterion has not been met, control passes back to the first step 905 whereby more training is undertaken. If the stopping criterion has been met, control passes to a fifth step 930.

In the fifth step 930, the echo canceller is configured to operate using the parameters finally converged upon in the fourth step 920. When a transform domain system is used, the transform domain parameters are inverse transformed in the block 715 to generate the filter parameters G(z) 430 for use in subsequent time domain processing. In a preferred embodiment, the step 930 also involves using the remote-echo canceller in a symmetric high-speed connection using a data rate in the range from 33.6 kbps to 56 kbps. For example, the fifth step 920 may involve operating a 53 kbps symmetric and bidirectional communication channel on a reasonably well conditioned POTS channel of the subscriber line 137. That is, the step 930 preferably involves communicating with an improved uplink data rate made possible by the presence of the remote-echo canceller 430.

In an alternative embodiment of the method 900 the steps 905, 910, and 930 are performed as discussed above, but the steps 915 and 920 are performed differently. In the third step 915, instead of transmitting the composite-remote-echo-error signal back to the subscriber modem, the adaptive filter update is performed in the far end modem. This is preferably performed by having the method begin with the far-end modem and the subscriber modem beginning with a known set of values. The filter adaptation (e.g. 625 or 725) is thus performed in the far-end modem and instead of transmitting the error signal in the step 915 the updated filter parameters are transmitted back. This provides a savings in channel bandwidth. In this case the step 920 is performed in the far-end modem prior to the modified step 915. The subscriber modem then receives a modulated signal which contains a digitally encoded representation of the adaptive filter parameters for the remote-echo canceller 335, 430. The subscriber modem demodulates these values in the modem receiver module 330 and couples the one or more adaptive parameter values into the feedback module 335 by writing them to an adaptive parameter variable embodied as one or more memory locations or registers. This type of processing may also be used in connection with the adaptive methods described in connection with FIG. 5.

Although the present invention has been described with reference to specific embodiments, other embodiments may occur to those skilled in the art without deviating from the intended scope. For example, the line cards 200 and 270 may be implemented as interfaces in larger systems whereby several or many "line cards" are implemented on one physical interface board. Also, while much of the discussion herein focuses on systems whereby the digital modem 105 communicates with the subscriber modem 300, 301, it is understood that the present invention supports symmetric peer-to-peer connections between pairs of subscriber modems 300, 301. Hence in any of the discussed configurations, the digital modem 105 may be replaced by a subscriber modem 300, 301. Also, an adder circuit in an adaptive echo canceller may be replaced by a subtractor circuit and vice-versa, in which case the echo canceller coefficients become sign inverted. In any of the methods illustrated in flow chart form, certain steps may be reordered to achieve the same result in a substantially similar way. Hence when the net result is not substantially altered, the ordering in the disclosed exemplary embodiments of the methods taught herein may be altered without deviating from the scope of the present invention. Also, while the methods have been disclosed in accordance with their preferred embodiments, other embodiments are possible. For example, instead of performing the block update in the forth step 920 in the subscriber modem, this can be performed in the far and modem and the updated parameters transmitted back to the subscriber modem 300, 301. This type of modification whereby the selection of which modem performs which steps can be altered in various steps of the disclosed methods by one of ordinary skill in the art to yield identical or substantially similar results so as to produce equivalent systems. Also, while a portion of this discussion focuses on achieving symmetric links, e.g. simultaneous 53 kbps in both directions, other asymmetric but improved arrangements such as 53 kbps downlink and 44 kbps uplink are also anticipated by the present invention. Similarly any of the disclosed "circuits" may be replaced by equivalent "modules" which may be implemented either as dedicated circuits or software routines controllably coupled to an appropriate processor such as a host processor or the DSP core 265, and operatively coupled as shown in the figures. Therefore, it is to be understood that the invention herein encompasses all such embodiments that do not depart from the spirit and scope of the invention as defined in the appended claims.

I claim:

1. An enhanced codec apparatus, comprising:
   a digital signal processor circuit;
   a digital interface port with a first coupling to said digital signal processor circuit and a second coupling to a digital network;
   a digital conversion subsystem comprising a DAC wherein said DAC has a digital input coupled to receive a digitally encoded signal sample derived from said digital interface port and an analog output coupled to a first analog signal port, said digital conversion subsystem also comprising an ADC that has a digital output and an analog input;
   an echo canceller processing module comprising an adaptive filter and a differential amplifier, said echo canceller processing module controllably coupled to said digital signal processing circuit and opertively coupled to receive at an X-input to said adaptive filter a digital representation of a signal derived from said digital interface port, said echo canceller processing module also operatively coupled to receive at a first input to said differential amplifier, a signal that passes through a second analog signal port, the output of said differential amplifier being coupled to said analog input of said ADC, said echo canceller processing module operative to cancel an echo component which leaks from the output of said first analog signal port back into the input of said second analog signal port when said first and second analog signal ports are coupled to a subscriber line;
   a pulse decoder processing module controllably coupled to said digital signal processing circuit and having an input operatively coupled to the output of said ADC, said pulse decoder processing module operative to regenerate a PCM data stream;
   wherein the output of said adaptive filter is fed through a second DAC, and a second input of said differential amplifier is coupled to the output of said second DAC.

2. The enhanced codec apparatus according to claim 1, wherein high-speed communications involves a data rate from 33.6 kbps to 56 kbps.

3. The enhanced codec apparatus according to claim 1, further comprising a chip carrier package which is pin-compatible with an existing PCM codec, whereby an existing line card can be upgraded to an enhanced line card by replacing said existing codec with said enhanced codec.

4. The enhanced codec apparatus according to claim 1, further comprising an out-of-band DSL processing circuit for processing DSL modem signals.

5. The enhanced codec according to claim 1, wherein said ADC samples its input at a first sample rate higher than a second sample rate employed by said digital interface.

6. The enhanced codec apparatus according to claim 1, further comprising:
   a protocol detect processing module controllably coupled to said digital signal processing circuit, said protocol detect processing module operative to detect a transmission protocol used within said POTS portion of said subscriber line and select a pulse decoder mapping operation in response thereto.

7. The enhanced codec apparatus according to claim 6, wherein said protocol detect module is further operative to detect an echo canceller training phase in said protocol and said enhanced codec further comprises:

an echo canceller training module controllably coupled to said digital signal processing circuit and operatively coupled to receive the detection output of said protocol detect module, said echo canceller training module operative train said echo canceller when an echo canceller training phase is detected by said protocol detect processing module.

8. The enhanced codec apparatus according to claim 6, wherein said protocol detect module is further operative to detect a subscriber line equalizer training phase in said protocol and said enhanced codec further comprises:

an equalizer processing module controllably coupled to said digital signal processing circuit and operatively coupled to receive the detection output of said protocol detect module and having an output operatively coupled to the input of said pulse decoder.

9. The enhanced codec apparatus according to claim 8, wherein said ADC samples its input at a first sample rate higher than a second sample rate employed by said digital interface, and said equalizer and pulse decoder processing modules process information at said first sample rate to produce a reencoded output at said second sample rate.

10. The enhanced codec apparatus according to claim 6, further comprising:

a programmable instruction memory;

wherein said protocol detect module detects a management protocol sequence and responds thereto by loading a new program instruction into said instruction memory.

11. The enhanced codec apparatus according to claim 1, further comprising:

a first filter interposed between the analog output of said DAC and said first analog signal port; and a second filter interposed between said second analog signal port and the analog input of said ADC.

12. The enhanced codec apparatus according to claim 1, further comprising said line interface circuit.

13. The enhanced codec apparatus according to claim 12, further comprising a line card.

14. The enhanced codec apparatus according to claim 13, further comprising a network interface equipment rack into which are plugged at least one of said line cards.

15. An enhanced codes apparatus comprising:

a digital to analog converter;

an analog-to-digital converter;

a mapping function module; and an echo canceller with an X-input coupled to the input of the digital-to-analog converter and a D-input coupled to the output of the analog-to-digital converter, said echo canceller operative to cancel an echo component leaking from the output of said digital-to-analog converter back to the input of the analog-to-digital converter;

a second digital-to-analog converter; and a differential amplifier circuit with a first differential input coupled to a line interface circuit and a second differential input coupled to the output of said second digital-to-analog converter, the output of said differential amplifier operatively coupled to the input of said analog-to-digital converter, said differential amplifier circuit operative to cancel said echo component prior to conversion by analog-to-digital converter;

wherein said mapping function module is operative to selectively convert a digital representation of an uplink-analog signal to one of a PCM waveform representation and a decoded bit stream inserted into a PCM data stream.

16. The apparatus of claim 15, further comprising:

a protocol detection module operative to detect whether said apparatus is being used for a high-speed uplink modem connection or a voice connection, and if said codec is used in a modem connection, to perform signal conditioning to recover a high-speed uplink bit stream, encode said high-speed uplink bit stream into a PCM data stream, and transmit said PCM data stream to a digital network.

17. The codec of claim 15, wherein said mapping function module further comprises a digital impairment compensation module.

18. The codec of claim 15, wherein said analog-to-digital converter uses a 16-bit linear format and samples at a sampling rate greater than 8000 Hz, and the mapping function module performs equalization, clock recovery, downsampling and pulse decoding to produce said PCM data stream.

19. A system for high speed voice circuit communication comprising an enhanced codec and a subscriber modem apparatus coupleable to a POTS channel of a subscriber line and operative to communicate with said enhanced codec, the apparatus comprising:

said enhanced codec comprising:

a voice band codec that processes uplink voice signals; and a high speed uplink pulse signal demodulator, said high speed pulse signal demodulator comprising an echo canceller that cancels an uplink echo and converts a high speed pulse train received on a POTS channel to a digital output signal;

whereby said enhanced codec selectively operates as an uplink digital data conversion circuit for voice signals and an uplink data demodulator for high speed pulse modem signals; and said subscriber modem, comprising:

a high-speed uplink transmitter coupled to transmit a high-speed pulse oriented modem signal onto the POTS channel of said subscriber line for reception by said enhanced codec, whereby said enhanced codec converts said high-speed pulse modem signal into a PCM data steam, and the combination of the enhanced codec and the subscriber modern apparatus provide substantially symmetric high speed data communication rates in an uplink and a downlink direction.

20. The subscriber modem apparatus of claim 19, further comprising:

a protocol module operative to transmit a training signal to said enhanced codec to allow said enhanced codec to configure a set of signal processing parameters contained therein.

21. The enhanced codec apparatus of claim 1, wherein the enhanced codec is for use in a network interface line card; and wherein said PCM data stream is coupled for transmission to said digital network via said digital interface, and said enhanced codec thereby enables high-speed digital communication in an uplink direction a using a POTS channel of a subscriber line.

22. An enhanced codec apparatus for use in a network interface line card, comprising:

a digital signal processor circuit;

a digital interface port with a first coupling to said digital signal processor circuit and a second coupling to a digital network;

a digital conversion subsystem comprising a DAC wherein said DAC has a digital input coupled to receive a digitally encoded signal sample derived from said digital interface port and an analog output coupled to a first analog signal port, said digital conversion subsystem also comprising an ADC that has a digital output and an analog input;

an echo canceller processing module comprising an adaptive filter and a differential amplifier, said echo canceller processing module controllably coupled to said digital signal processing circuit and operatively coupled to receive at an X-input to said adaptive filter a digital representation of a signal derived from said digital interface port said echo canceller processing module also operatively coupled to receive at a first input to said differential amplifier, a signal that passes through a second analog signal port, the output of said differential amplifier being coupled to said analog input of said ADC, said echo canceller processing module operative to cancel an echo component which leaks from the output of said first analog signal port back into the input of said second analog signal port when said first and second analog signal ports are coupled to a subscriber line;

a pulse decoder processing module controllably coupled to said digital signal processing circuit and having an input operatively coupled to the output of said ADC, said pulse decoder processing module operative to regenerate a PCM data stream;

wherein said PCM data stream is coupled for transmission to said digital network via said digital interface, and said enhanced code thereby enables high-speed digital communication in an uplink direction using a POTS channel of a subscriber line; and wherein the output of said adaptive fitter is fed through a second DAC, and a second input of said differential amplifier is coupled to the output of said second DAC.

23. The enhanced codec apparatus according to claim 22, wherein said echo canceller is trained using an FXLMS algorithm.

24. The subscriber modem apparatus of claim 19, whereby the uplink data transmitter is capable of operating in a mode where it transmits pulse data to the enhanced codec to provide an uplink data rate selected between 53 kbps and 64 kbps.

* * * * *